US011564268B2

(12) United States Patent
Wallentin et al.

(10) Patent No.: US 11,564,268 B2
(45) Date of Patent: Jan. 24, 2023

(54) RADIO RESOURCE CONTROL CONNECTION ESTABLISHMENT

(71) Applicant: Telefonaktiebolaget LM Ericsson (publ), Stockholm (SE)

(72) Inventors: Pontus Wallentin, Linköping (SE); Mats Folke, Vällingby (SE); Christofer Lindheimer, Linköping (SE); Patrik Rugeland, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 432 days.

(21) Appl. No.: 16/334,564

(22) PCT Filed: Sep. 29, 2017

(86) PCT No.: PCT/SE2017/050958
§ 371 (c)(1),
(2) Date: Mar. 19, 2019

(87) PCT Pub. No.: WO2018/063082
PCT Pub. Date: Apr. 5, 2018

(65) Prior Publication Data
US 2020/0120728 A1 Apr. 16, 2020

Related U.S. Application Data

(60) Provisional application No. 62/402,237, filed on Sep. 30, 2016.

(51) Int. Cl.
*H04W 76/14* (2018.01)
*H04W 8/08* (2009.01)
(Continued)

(52) U.S. Cl.
CPC ............. *H04W 76/14* (2018.02); *H04W 8/08* (2013.01); *H04W 76/11* (2018.02); *H04W 76/25* (2018.02);
(Continued)

(58) Field of Classification Search
CPC ..... H04W 76/14; H04W 76/25; H04W 76/11; H04W 8/08; H04W 88/04; H04W 76/27; H04W 88/10; H04W 92/02
See application file for complete search history.

(56) References Cited

U.S. PATENT DOCUMENTS 9,706,466 B2 * 7/2017 Zhang ................... H04W 36/08
9,894,591 B2 * 2/2018 Chung .................. H04W 72/04
(Continued)

FOREIGN PATENT DOCUMENTS

| EP | 2954748 A1 | 12/2015 |
|---|---|---|
| GB | 2523328 A | 8/2015 |
| WO | 2015125479 A1 | 8/2015 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.4.0, Jun. 2016, 1-310.

(Continued)

*Primary Examiner* — Diane L Lo
*Assistant Examiner* — Abusayeed M Haque
(74) *Attorney, Agent, or Firm* — Murphy, Bilak & Homiller, PLLC

(57) ABSTRACT

A method for establishing a radio resource control connection between a first wireless device and a radio network node, comprises transmitting a request for a radio resource control connection towards the radio network node from the first wireless device to a second wireless device. Then, the second wireless device forwards the request for a radio resource control connection towards the radio network node to the radio network node. The forwarding by the second wireless device uses an already established radio resource control signaling connection between the second wireless device and the radio network node.

7 Claims, 22 Drawing Sheets

(51) Int. Cl.
*H04W 76/27* (2018.01)
*H04W 76/25* (2018.01)
*H04W 76/11* (2018.01)
*H04W 80/02* (2009.01)
*H04W 88/04* (2009.01)
*H04W 84/04* (2009.01)

(52) U.S. Cl.
CPC ........... *H04W 76/27* (2018.02); *H04W 80/02* (2013.01); *H04W 88/04* (2013.01); *H04W 84/042* (2013.01)

(56) References Cited

U.S. PATENT DOCUMENTS

| | | | | |
|---|---|---|---|---|
| 2013/0287012 A1* | 10/2013 | Pragada | ................ | H04W 76/22 370/338 |
| 2014/0016537 A1* | 1/2014 | Khobare | ........... | H04W 36/0079 370/315 |
| 2014/0378123 A1* | 12/2014 | Stojanovski | ........ | H04W 56/001 455/39 |
| 2017/0135095 A1* | 5/2017 | Chandwani | ....... | H04W 72/0446 |
| 2018/0054804 A1* | 2/2018 | Luo | ........................ | H04W 88/04 |
| 2018/0199390 A1* | 7/2018 | Hahn | .................... | H04W 76/27 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.2.0, Jun. 2016, 1-91.

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.2.0, Jun. 2016, 1-623.

Unknown, Author, "Control plane architecture", 3GPP TSG-RAN WG2 #95bis Tdoc R2-166725, Kaohsiung, Taiwan, Oct. 10-14, 2016, 1-7.

Unknown, Author, "Service Continuity and Mobility", 3GPP TSG-RAN WG2 #95bis Tdoc R2-166729, Kaohsiung, Taiwan, Oct. 10-14, 2016, 1-5.

* cited by examiner

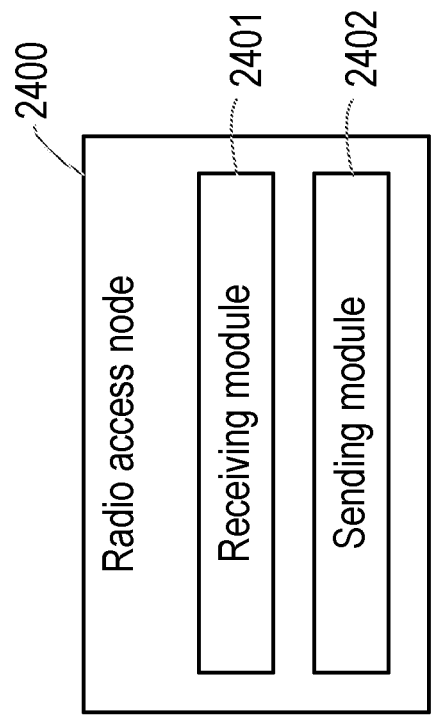
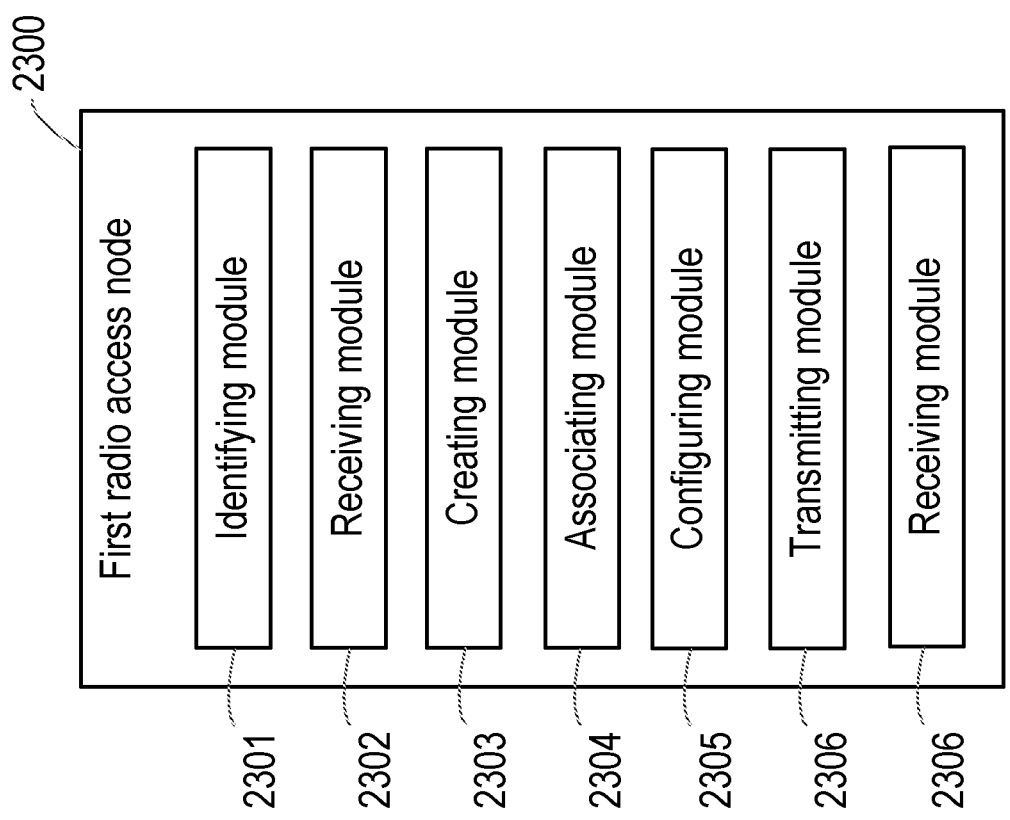

RADIO RESOURCE CONTROL CONNECTION ESTABLISHMENT

BACKGROUND

Proximity-based Services (ProSe) was developed by 3GPP in Rel-12 as a way to provide device-to-device (D2D) communication over the LTE, also known as LTE sidelink communications. One application for this is Public Safety. The ProSe UE-to-Network Relay was also developed for public safety applications, initially to extend connectivity to out-of-coverage (OoC) UEs in 3GPP rel-13. FIG. 1 shows a network configuration for use in Public Safety, in which a remote UE 101 connects through a ProSe UE-to-Network Relay 103 over the direct UE-to-UE interface, also known as the LTE sidelink. The relay 103 connects over the Uu interface to a radio access network node such as an eNodeB (eNB) 105, which is connected to the Extended Packet Core (EPC) 107. The applications, such as Mission Critical Push to Talk (MCPTT), are served by a Public Safety Application Server (AS) 109, which is connected to the EPC over a SGi interface.

The ProSe UE-to-Network Relay node 103 may for example be a UE with capabilities to serve as relay for remote UEs. FIG. 2 shows how relaying is initiated in a network such as that shown in FIG. 1, including a Mobility Management Entity (MME) 221, Serving Gateway (S-GW) 223 and Packet Gateway (P-GW) 225 as EPC network nodes. At step 201, the relay UE sets up a PDN connection to the core network (EPC) using the Attach procedure via the eNB. At step 202, the remote UE 101 and the relay UE 103 perform a discovery procedure (using either Model A or Model B) and at step 203 they establish a connection for one-to-one communication, so that they are able to use sidelink communication over PC5. At step 204, an IP address and prefix are allocated and, at step 205, the relay UE sends a report to the MME identifying the remote user and giving IP information, and the MME sends this report to the P-GW at step 206. Thereafter, the remote UE 101 is able to send relayed traffic through the relay UE to the packet gateway. Thus, for example, the remote UE may setup a PDN connection to the network while it is in E-UTRAN network coverage. When the remote UE leaves coverage, it may start searching (using the discovery process) for a relay UE and then connect to it over the sidelink, and via the relayed data still have connectivity with the Public Safety Application Server (AS), using the PDN connection of the relay UE.

FIG. 3 is a protocol stack diagram showing the protocols in use in the network of FIG. 1. As shown in FIG. 3, the ProSe UE-to-Network Relay in rel-13 was developed as a layer 3 relay. Thus, the relaying of data takes place in the IP layer. In other words, the ProSe UE-to-Network Relay resembles the function of an IP router, and the traffic to/from the Remote UE cannot be distinguished from other traffic to/from the ProSe UE-to-Network Relay, at least not by the eNB, since the eNB does not terminate the IP layer.

In order for the ProSe UE-to-Network Relaying to begin, the Prose UE-to-Network Relay UE and the ProSe Remote UE must first discover each other. The procedure to do this is that one of the UEs transmits a discovery message on the PC5 discovery channel, while the other UE monitors the PC5 discovery channel. There are two types of discovery types; Model A and B.

FIG. 4 illustrates model A discovery ("I am here"), in which, once the service has been authorised at step 401, the announcing UE, shown at 402*a* broadcasts information at step 403*a* at pre-defined intervals, necessary for other UEs to connect to it, which the discovering UE, shown at 402*b*, monitors at step 403*b*, and processes at step 404*b* when it detects a match. When applied to relay discovery, the relay UEs transmit such periodic announcements, and any remote UEs may monitor these announcements.

FIG. 5 illustrates model B discovery ("who is there?"/ "Are you there?), in which, once the service has been authorised at step 501, the announcing UE or discoverer UE, shown at 502*b*, transmits a request at step 503*b* with certain information it is interested to discover. The discovering UE, shown at 502*a*, monitors the PC5 link for ProSe query codes at step 503*a*, and can then respond at step 504*a* with information related to the discoverer's request if a ProSe query code matches. As shown at step 504*b*, the discoverer UE monitors PC5 for ProSe response codes. However, for Model B, only an authorized UE may announce or respond to the announcement. When applied to relay discovery, it is the remote UE which transmits the announcement (including some specific interest, e.g. which external network it wants to reach via the candidate relay UE), and the relay UE fulfilling the interest request will then have the opportunity to respond back.

Once the UEs have discovered each other, they can (if allowed by the network) establish a PC5 link between them and if allowed one of the UEs can be configured to relay traffic from the other UE to the network.

Recent developments in 3GPP now propose to introduce an evolved version of the ProSe UE-to-Network Relay, where relaying is instead operated on layer 2. This development is part of the Further Enhanced D2D (FeD2D) study item in 3GPP RAN as part of Rel-14.

An example scenario for FeD2D is a small low powered device, such as a wristwatch, which, in order to e.g. save battery power, instead of using the Uu radio interface, uses a D2D interface, such as LTE sidelink or some non-3GPP technology such as Bluetooth or WLAN to reach the network via an LTE UE (e.g. a smartphone) which operates as a relay. This scenario is also known as relaying for wearables, or alternatively relaying for Internet of Things (IoT). As this kind of relaying is a commercial D2D application (opposed to Public Safety), aspects such as security, charging and Quality of Service (QoS) are very important. Such aspects may be better solved by a layer 2 relay compared to a layer 3 relay.

An example of a protocol architecture for this layer 2 relay is illustrated in FIG. 6. In general, the Remote UE and the Relay UE can be connected to the same eNB, or different eNBs if there is an X2 connection between the eNBs. The serving eNB of the remote UE provides bearers to the core network via the GTP protocol, and so the core network may not be aware that the data of these bearers are actually relayed via the relay UE. Moreover, the remote UE has still its own PDN connection, with its own IP address, even if it uses the layer 2 relay.

FIGS. 7*a* and 7*b* illustrate the procedure to establish an RRC connection in 3GPP LTE. This procedure is specified in 3GPP TS 36.331 (RRC specification) and TS 36.321 (MAC specification).

The purpose of the RRC Connection Establishment procedure is to establish the signaling radio bearer 1 (SRB1) used for the dedicated RRC signaling between the UE and an eNB. Before this procedure, only SRB0 is available, which is mapped a common control channel and the first RRC message exchange to establish the RRC connection needs to use SRB0.

The triggering of the establishment is typically in the Non-Access Stratum (NAS) layers, such as the EMM layer of the UE, for example when an application has data to transmit to the network.

In steps 702-706, the MAC layer first performs a random access procedure, which may be subject to contention in case more than one UE makes an attempt using the same random access preamble. As part of the procedure, an identifier, known as the Cell-Radio Network Temporary Identifier (C-RNTI) is allocated, first as a temporary C-RNTI When the UE has been assigned the temporary RNTI it can send the RRCConnectionRequest, which is an RRC message, in step 709. A UE context in the eNB is created in step 710.

The contention resolution is performed by the MAC layer, by responding with the same UE identity as sent in step 709 back to the UE in step 712. When the UE identity received by the UE in step 713 is the same one as was sent by the UE the temporary C-RNTI becomes final.

After the UE receives the RRCConnectionSetup message in step 714, the UE enters RRC_CONNECTED (in other words, has an RRC connection). The UE then sends an RRCConnectionSetupComplete in step 716, which includes, among other things, a first Non-Access Stratum (NAS) message, which is used by the eNB in step 717 to request to setup a connection with the MME. The MME then proceeds with authentication and start of ciphering and integrity protection in step 718. After this is successful, the MME downloads a configuration of e.g. bearers as well as a permanent UE identity (IMSI) in step 719. The eNB uses RRC signaling to establish these bearers with the UE in step 720, and finally it acknowledges the MME in step 721.

For evolved ProSe UE-to-Network Relay, different solutions for layer 2 relaying have been discussed in standardization fora, such as 3GPP. One of these solutions introduce the possibility to relay not only user data, but also control plane signaling such as the RRC protocol. To fully support relaying of signaling, there is a need for solutions of how such control plane and respective signaling is handled, both in the remote UE, in the relay UE and in the network node, eNB. In particular, there is a need for a solution of RRC connection establishment, involving a Relay UE, when the connection between a Remote UE and a network node, eNB, needs to go through a Relay UE. In addition, such solution for RRC connection establishment should preferably avoid large impacts on involved entities (eNB, Relay UE, Remote UE), but benefit from already standardized or supported methods.

SUMMARY

According to the present invention, there are provided methods and network entities such as mobile devices and radio access network nodes that deal with issues relating to establishing a radio resource control connection in the case of UE-to-Network relaying.

According to a first aspect, there is provided a method for establishing a radio resource control connection between a first wireless device and a radio network node. The method comprises the steps of: transmitting, by said first wireless device, a request for a radio resource control connection towards the radio network node to a second wireless device; and forwarding, by said second wireless device, said request for a radio resource control connection towards the radio network node to the radio network node, wherein said forwarding by said second wireless device uses an already established radio resource control signaling connection between said second wireless device and the radio network node.

According to a second aspect, there is provided a radio network, comprising a first wireless device and a second wireless device. The first wireless device and the second wireless device each comprise a processor and a memory. The memories contain instructions executable by the processors, such that the radio network is operable to: transmit, by said first wireless device, a request for a radio resource control connection towards the radio network node to a second wireless device; and forward, by said second wireless device, said request for a radio resource control connection towards the radio network node to the radio network node, wherein said forwarding by said second wireless device uses an already established radio resource control signaling connection between said second wireless device and the radio network node.

According to a third aspect, there are provided a computer program configured, when run on one or more computer, to carry out a method according to the first aspect, and a computer program product comprising a computer readable medium and such a computer program.

According to a fourth aspect, there is provided a method of operation of a first user equipment, UE. The method comprises: obtaining a first relayed signalling radio bearer configuration; sending a radio resource control connection request to a second UE, using the first relayed signalling radio bearer; obtaining a second relayed signalling radio bearer configuration; configuring a second relayed signalling radio bearer for communication with a radio access node; receiving a radio resource control setup message from the radio access node via the second UE using the relayed first signalling radio bearer; and informing the radio access node that the radio resource control connection is complete, using the second relayed signalling radio bearer.

According to a fifth aspect, there is provided a user equipment, comprising a processor and a memory. The memory contains instructions executable by the processor, such that the user equipment is operable to: obtain a first relayed signalling radio bearer configuration; send a radio resource control connection request to a second UE, using the first relayed signalling radio bearer; obtain a second relayed signalling radio bearer configuration; configure a second relayed signalling radio bearer for communication with a radio access node; receive a radio resource control setup message from the radio access node via the second UE using the relayed first signalling radio bearer; and inform the radio access node that the radio resource control connection is complete, using the second relayed signalling radio bearer.

According to a sixth aspect, there are provided a computer program configured, when run on one or more computer, to carry out a method according to the fourth aspect, and a computer program product comprising a computer readable medium and such a computer program.

According to a seventh aspect, there is provided a method of operation of a second user equipment, UE. The method comprises: identifying a relayed first signalling radio bearer configuration for communicating relayed first signalling radio bearer messages with a radio access node; configuring a relayed first signalling radio bearer configuration for communicating first signalling radio bearer messages with a first UE; associating (a) the relayed first signalling radio bearer configuration for communicating relayed first signalling radio bearer messages with the radio access node with (b) the relayed first signalling radio bearer configuration for communicating first signalling radio bearer messages with the first UE; receiving a radio resource control connection request from the first UE, wherein the radio resource control connection request uses the first relayed signalling radio bearer; and transmitting a radio resource control message to the radio access node using the relayed first signalling radio bearer, wherein said radio resource control message indicates that the first UE wishes to establish a radio resource control connection with the radio access node.

The method may further comprise: receiving from the radio access node a reconfiguration with a relayed second signalling radio bearer configuration for communicating relayed second signalling radio bearer messages with the radio access node and the first UE, the reconfiguration identifying the first UE; configuring the relayed second signalling radio bearer configuration for communicating relayed second signalling radio bearer messages with the radio access node; configuring the relayed second signalling radio bearer configuration for communicating relayed second signalling radio bearer messages with the first UE; and associating (c) the relayed second signalling radio bearer configuration for communicating relayed second signalling radio bearer messages with the radio access node with (d) the relayed second signalling radio bearer configuration for communicating second signalling radio bearer messages with the first UE.

According to an eighth aspect, there is provided a user equipment, comprising a processor and a memory. The memory contains instructions executable by the processor, such that the user equipment is operable to: identify a relayed first signalling radio bearer configuration for communicating relayed first signalling radio bearer messages with a radio access node; configure a relayed first signalling radio bearer configuration for communicating first signalling radio bearer messages with a first UE; associate (a) the relayed first signalling radio bearer configuration for communicating relayed first signalling radio bearer messages with the radio access node with (b) the relayed first signalling radio bearer configuration for communicating first signalling radio bearer messages with the first UE; receive a radio resource control connection request from the first UE, wherein the radio resource control connection request uses the first relayed signalling radio bearer; and transmit a radio resource control message to the radio access node using the relayed first signalling radio bearer, wherein said radio resource control message indicates that the first UE wishes to establish a radio resource control connection with the radio access node.

According to a ninth aspect, there are provided a computer program configured, when run on one or more computer, to carry out a method according to the seventh aspect, and a computer program product comprising a computer readable medium and such a computer program.

According to a tenth aspect, there is provided a method of operation of a radio access node. The method comprises: identifying a relayed first signalling radio bearer configuration for communicating relayed first signalling radio bearer messages with a second user equipment, UE, wherein the second UE has a radio resource control context at the radio access node; receiving a radio resource control message from the second UE using the relayed first signalling radio bearer, wherein said radio resource control message indicates that a first UE wishes to establish a radio resource control connection with the radio access node; creating a radio resource control context for the first UE; associating the radio resource control context for the first UE with the radio resource control context for the second UE; configuring a relayed second signalling radio bearer configuration for communicating relayed second signalling radio bearer messages with the first UE; transmitting a radio resource control setup message for the first UE via the second UE using the relayed first signalling radio bearer; and receiving information from the first UE that the radio resource control connection is complete, using the second relayed signalling radio bearer.

The method may further comprise: reconfiguring the second UE with the relayed second signalling radio bearer configuration for communicating relayed second signalling radio bearer messages with the first UE and identifying the first UE in said relayed second signalling radio bearer configuration.

According to an eleventh aspect, there is provided a first radio access node in a radio access network further comprising a second radio access node. The first radio access node comprises a processor and a memory. The memory contains instructions executable by the processor, such that the first radio access node is operable to: identify a relayed first signalling radio bearer configuration for communicating relayed first signalling radio bearer messages with a second user equipment, UE, wherein the second UE has a radio resource control context at the radio access node; receive a radio resource control message from the second UE using the relayed first signalling radio bearer, wherein said radio resource control message indicates that a first UE wishes to establish a radio resource control connection with the radio access node; create a radio resource control context for the first UE; associate the radio resource control context for the first UE with the radio resource control context for the second UE; configure a relayed second signalling radio bearer configuration for communicating relayed second signalling radio bearer messages with the first UE; transmit a radio resource control setup message for the first UE via the second UE using the relayed first signalling radio bearer; and receive information from the first UE that the radio resource control connection is complete, using the second relayed signalling radio bearer.

According to a twelfth aspect, there are provided a computer program configured, when run on one or more computer, to carry out a method according to the tenth aspect, and a computer program product comprising a computer readable medium and such a computer program.

According to a thirteenth aspect, there is provided a method of operation of a radio access node. The method comprises: receiving a message from a user equipment, UE, said message indicating that the UE has set up a connection with the radio access node, and said message having been relayed through a relay UE after the UE has established a relay relationship with the relay UE; and sending a message to a core network node, said message requesting that a signalling connection be established between the core network node and the UE, wherein the message to the core network node includes non-access stratum, NAS, information contained in the message received from the UE.

The message received from the UE may inform the radio access node that a Radio Resource Control (RRC) connection setup is complete.

The message to the core network node may be a request to establish a NAS signalling connection between the core network node and the UE.

According to a fourteenth aspect, there is provided a radio access node in a radio access network. The radio access node comprises a processor and a memory, the memory containing instructions executable by the processor, such that the radio access node is operable to: receive a message from a user equipment, UE, said message indicating that the UE has set up a connection with the radio access node, and said message having been relayed through a relay UE after the UE has established a relay relationship with the relay UE; and send a message to a core network node, said message requesting that a signalling connection be established between the core network node and the UE, wherein the message to the core network node includes non-access stratum, NAS, information contained in the message received from the UE.

According to a fifteenth aspect, there are provided a computer program configured, when run on one or more computer, to carry out a method according to the thirteenth aspect, and a computer program product comprising a computer readable medium and such a computer program.

BRIEF DESCRIPTION OF DRAWINGS

FIG. 23 illustrates a first radio access node in a radio access network;
and
FIG. 24 illustrates a radio access node in a radio access network.

DETAILED DESCRIPTION

Figure 1:
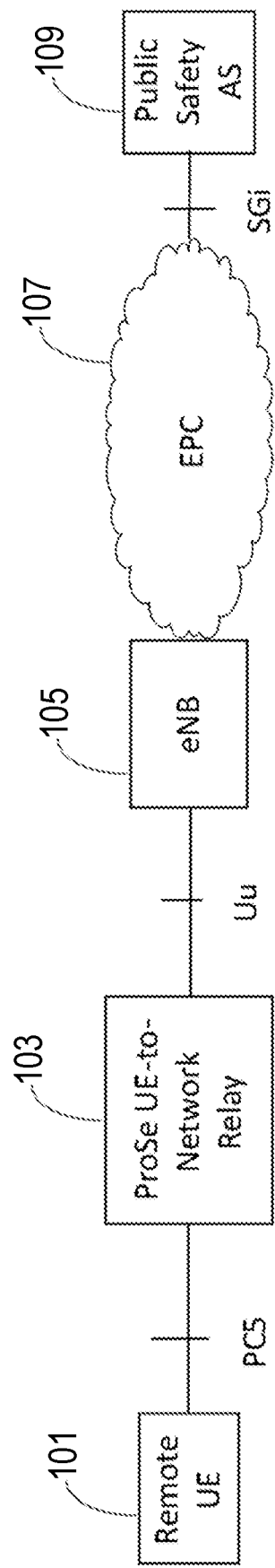
FIG. 1 shows a part of a network.
Figure 2:
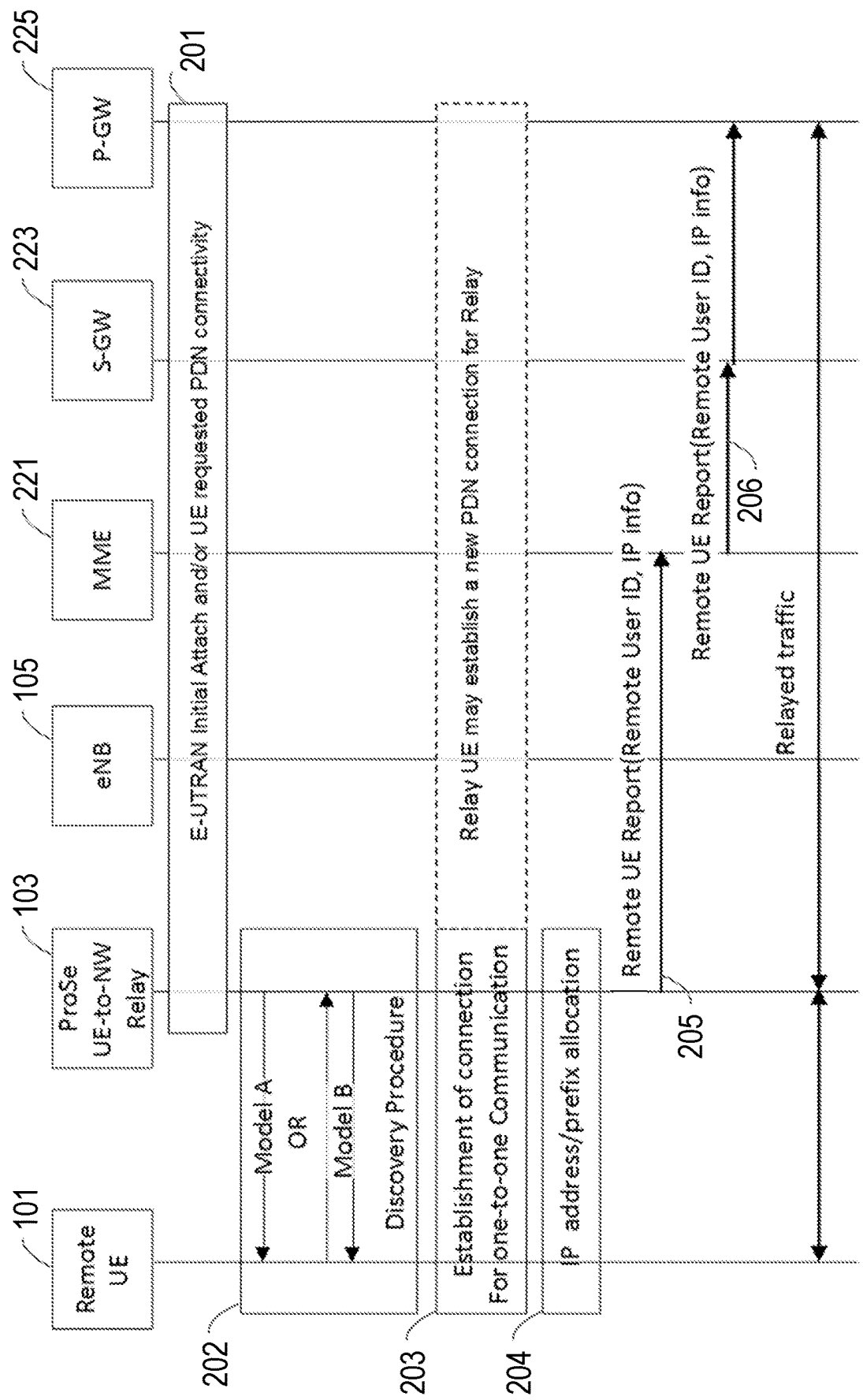
FIG. 2 illustrates signalling in the network of FIG. 1.
Figure 3:
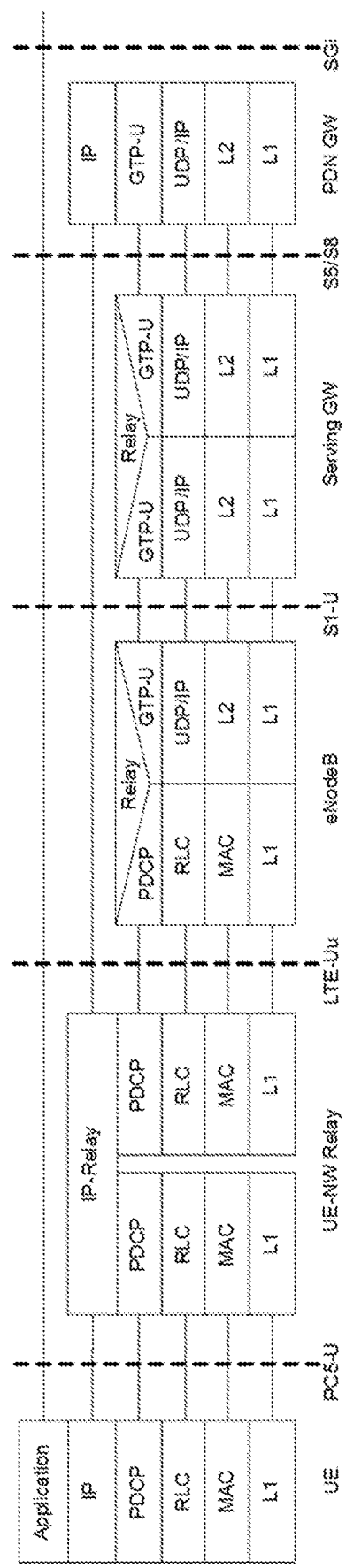
FIG. 3 illustrates various protocol layers in the network of FIG. 1.
Figure 4:
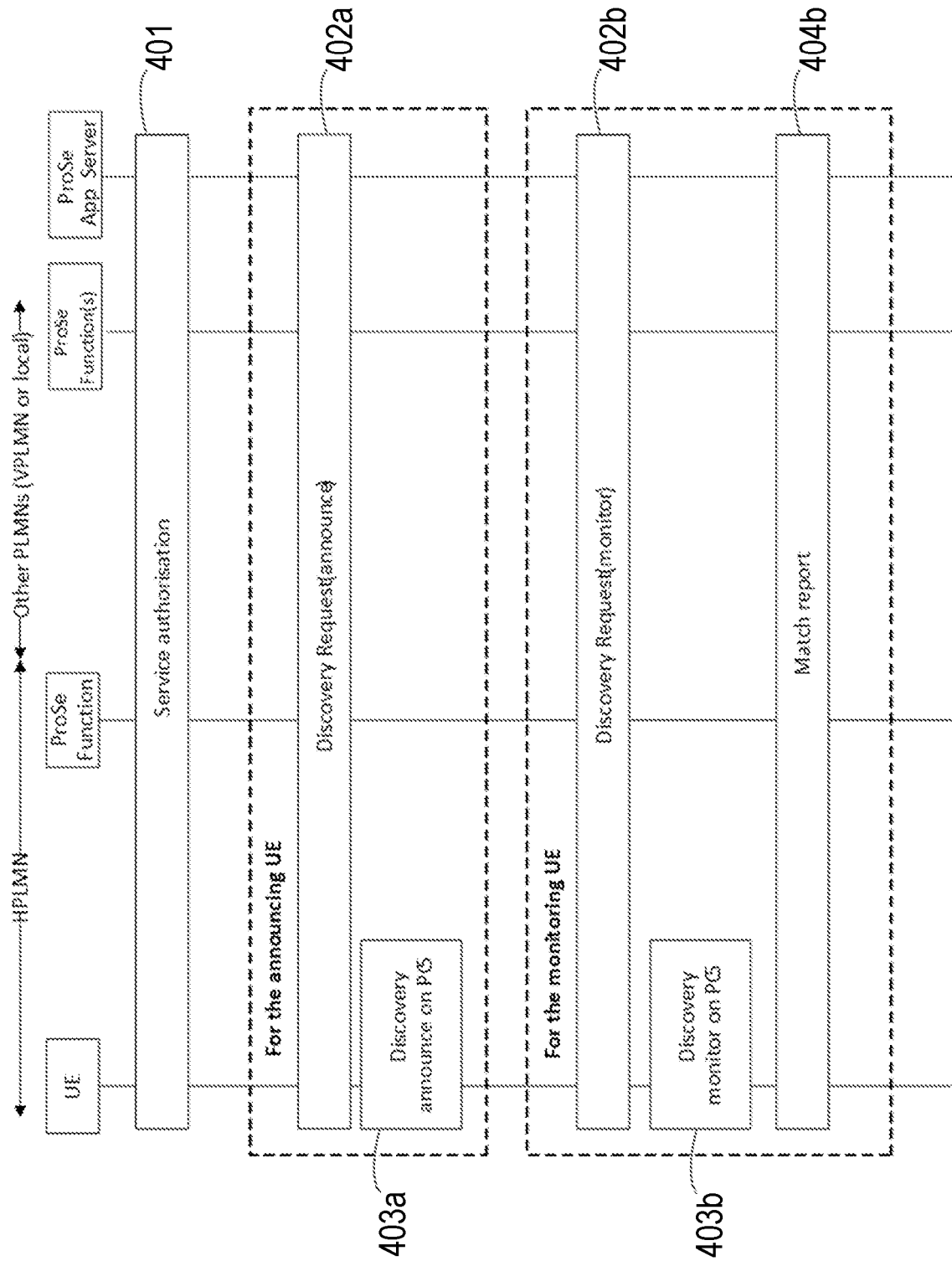
FIG. 4 illustrates exemplary methods and communication between functions of ProSe.
Figure 5:
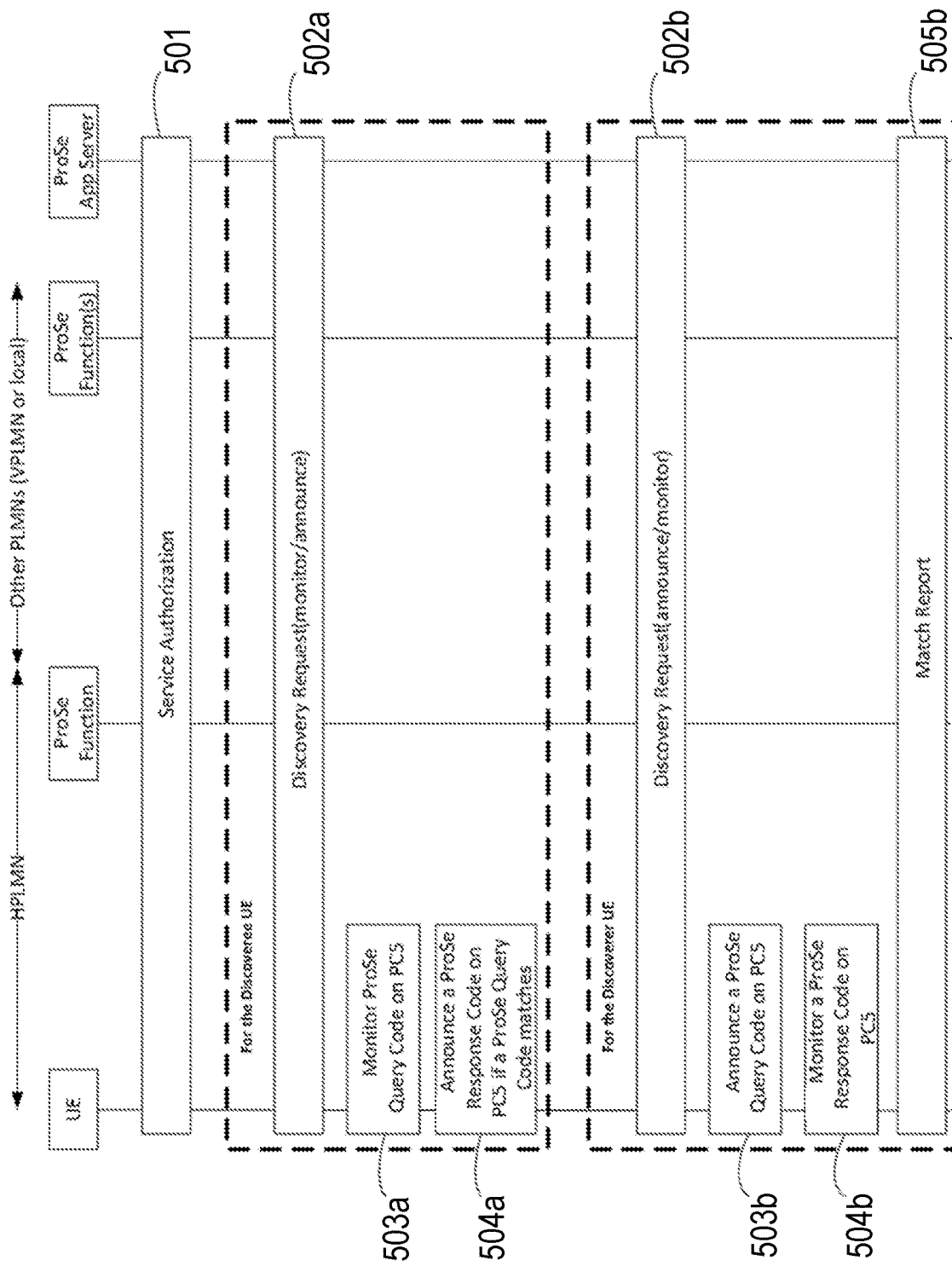
FIG. 5 illustrates exemplary methods and communication between functions of ProSe.
Figure 6:
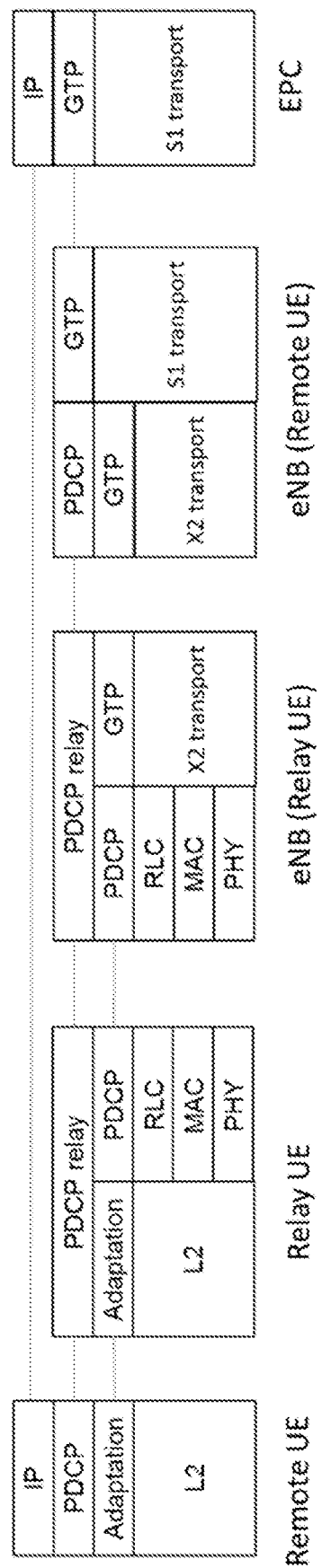
FIG. 6 illustrates various protocol layers in the network of FIG. 1.
Figure 7A:
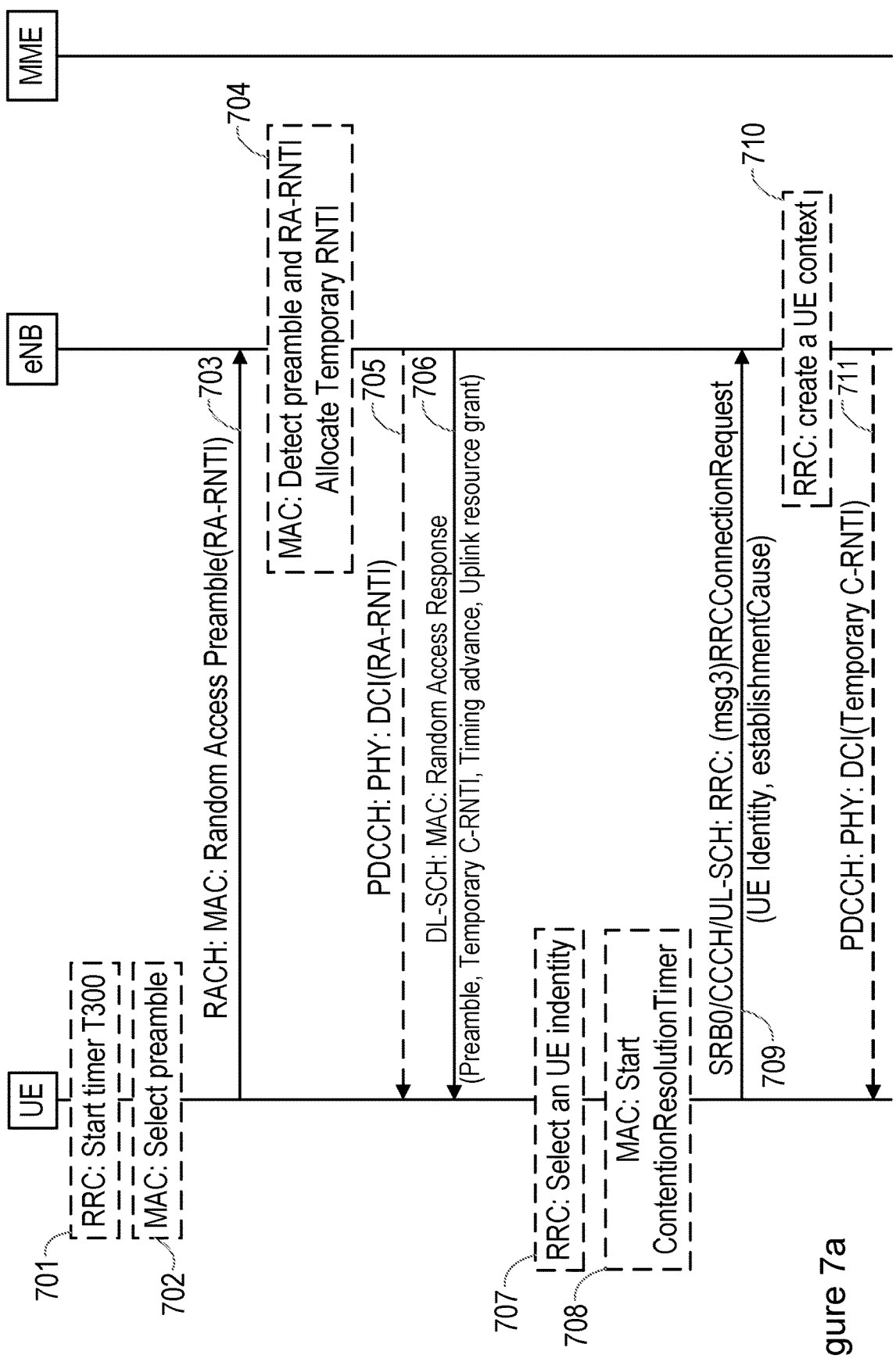
FIGS. 7a and 7b illustrate signalling for radio resource control connection establishment.
Figure 7B:
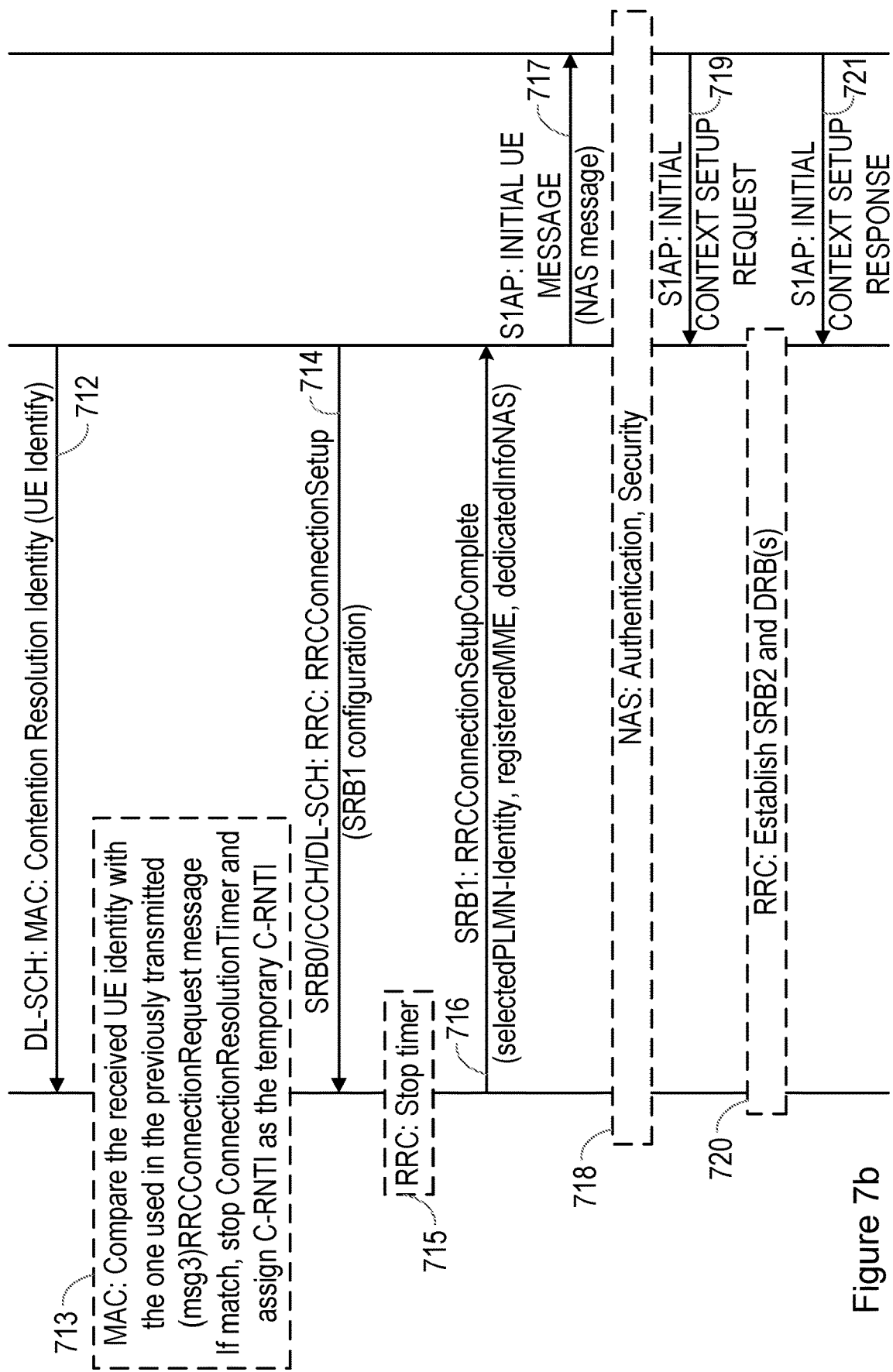

The following sets forth specific details, such as particular embodiments for purposes of explanation and not limitation.

But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP. However, it will be appreciated that the invention may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

One objective with the solution described herein is to establish an RRC connection between a Remote UE and an eNB through a Relay UE, while reusing the current RRC Connection Establishment procedure, but at the same time avoiding the MAC random access procedure that is part of the conventional RRC Connection Establishment.

The solution described herein reuses, and enhances, the RRC signalling messages to establish an RRC connection, using a first transport mechanism over the relayed link (between the remote UE and the relay UE), a method to relay these RRC signalling messages in the relay UE, and a second transport mechanism between the relay UE and the network. The first transport mechanism depends on the radio technology used over the relay link. The second transport mechanism is not based on the MAC random access procedure, but instead the existing signalling radio bearer is used (such as SRB1) belonging to the relay UE. As part of establishing a relayed RRC connection, the solution also includes methods to configure a relayed SRB0 configuration in the relay UE and remote UE as well as associate the remote UE with the relay UE in the eNB.

This has the advantage that the RRC connection can be established between a remote UE and an eNB, where the signalling radio bearers, carrying the control plane messages (e.g. RRC) are relayed via a relay UE. This also includes a method to relay the signalling radio bearer used for the actual establishment (rSRB0). The relayed signalling radio bearer rSRB0 is a relayed version of SRB0, meaning that it fulfills the same properties as SRB0, with the only difference being that it is relayed via the Relay UE and the endpoints being the RRC contexts in the eNB and the Remote UE. Relayed signalling radio bearers rSRB1 and rSRB2 have the same relation to SRB0 and SRB1.

As an additional advantage, an RRC connection can be established via a relay UE, based on the current RRC procedure, using the same RRC messages between the remote UE and the eNB and at the same time avoiding the MAC random access procedure, thus using a contention free channel.

Yet another advantage is that there is no impact on the core network or the upper layer Non Access Stratum (NAS) protocols.

Figure 8:
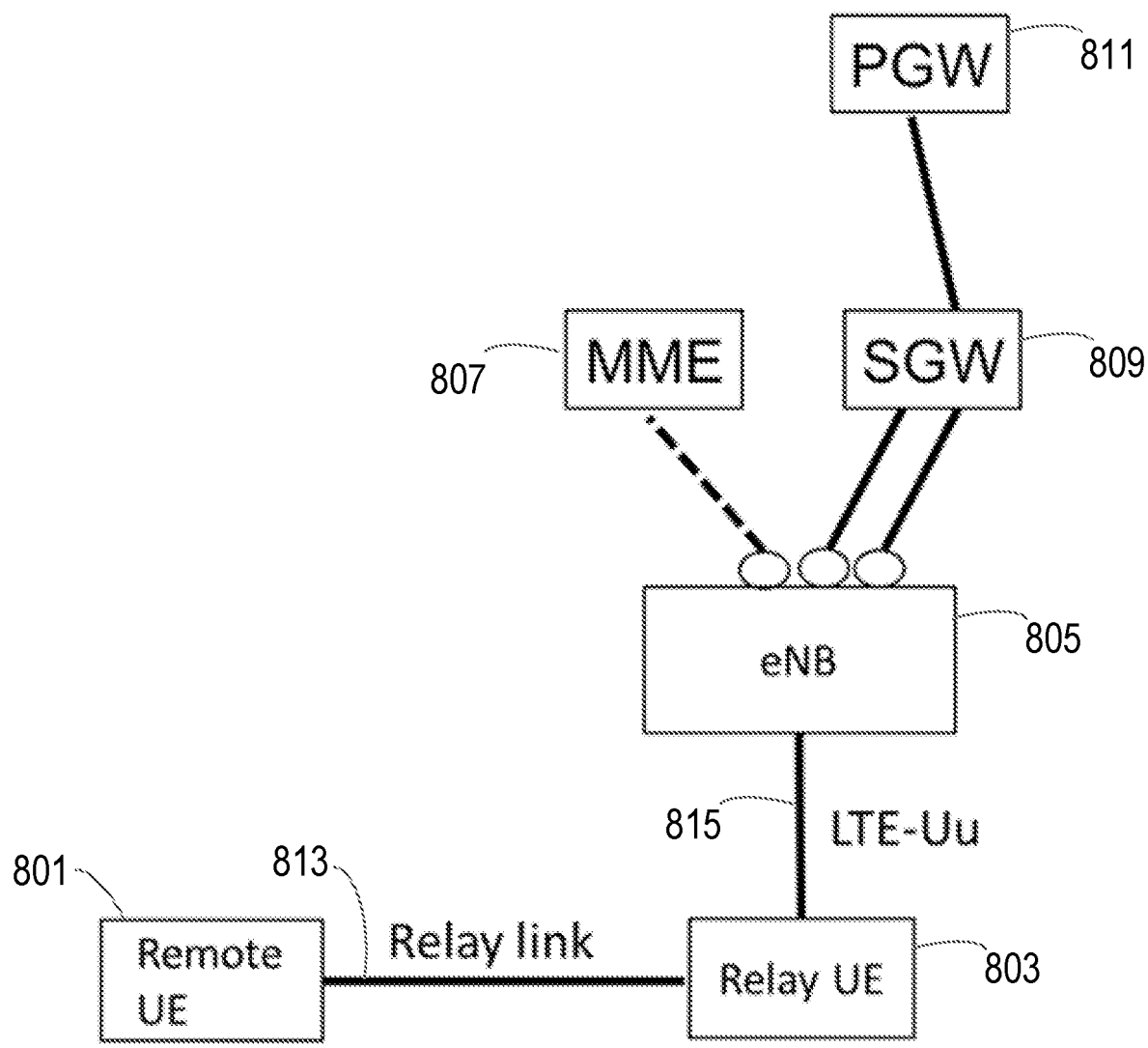
FIG. 8 illustrates connections in a network according to the present invention.

FIG. 8 shows the entities involved in the methods described herein. Specifically, FIG. 8 illustrates a situation, in which two UEs, namely a remote UE 801 and a relay UE 803, are served by the same eNB 805. The eNB 805 has connections to core network nodes such as a Mobility Management Entity (MME) 807; Serving Gateway (S-GW) 809; and Packet Gateway (P-GW) 811. Thus, traffic between the remote UE 801 and the network can be relayed by the relay UE 803, using a relay link 813 between the remote UE 801 and the relay UE 803 (and this relay link can take any suitable form), and using the relay UE's existing connection 815 to the core network (which is an LTE-Uu interface in the illustrated example).

Before the Remote UE 801 can be served by the eNB 805, there is a need to establish radio bearers both in the control plane (SRB's), and ultimately also on user plane (DRB's).

Figure 9A:
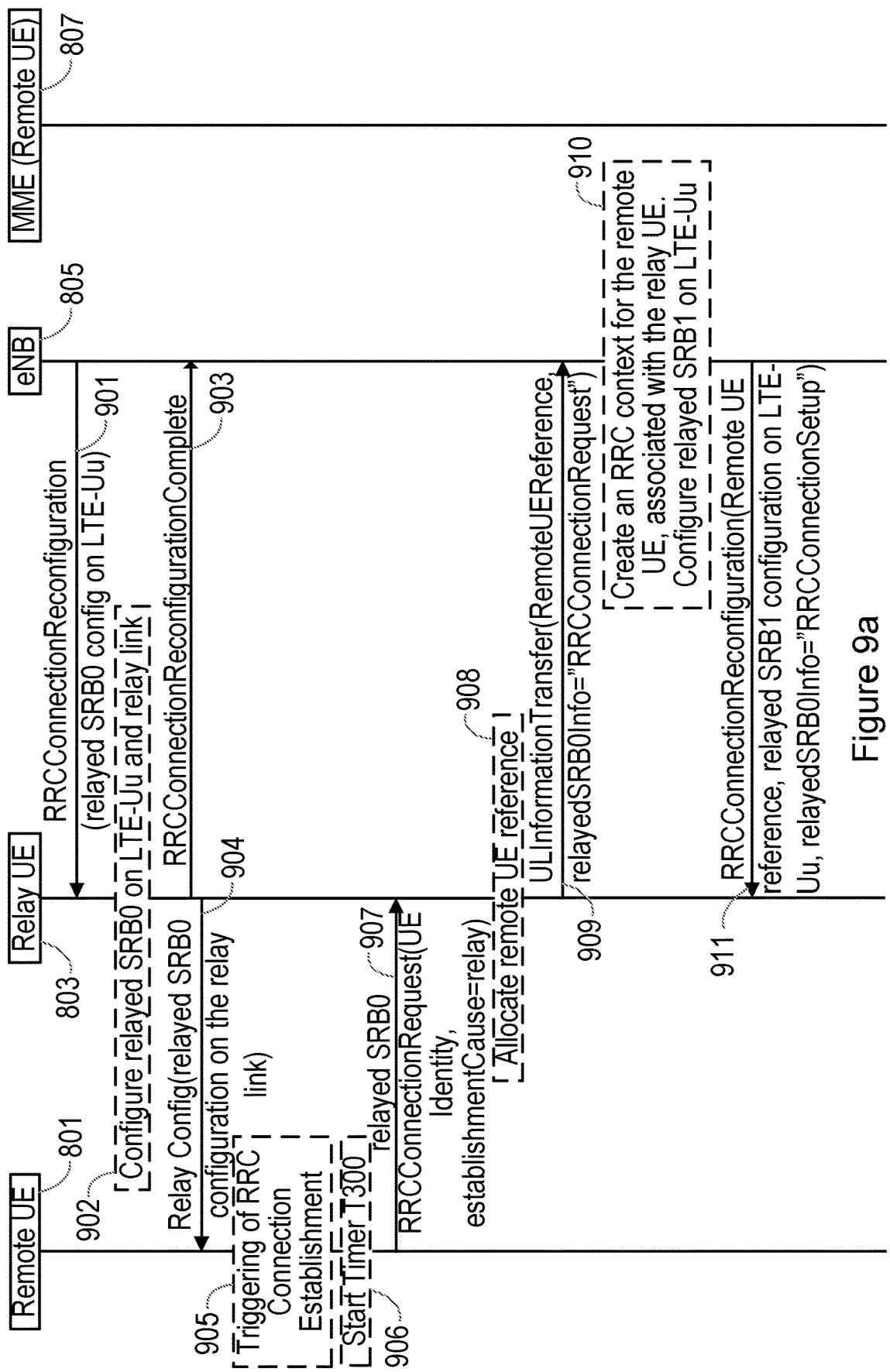
FIGS. 9a and 9b illustrate signalling for radio resource control connection establishment according to the present invention.
Figure 9B:
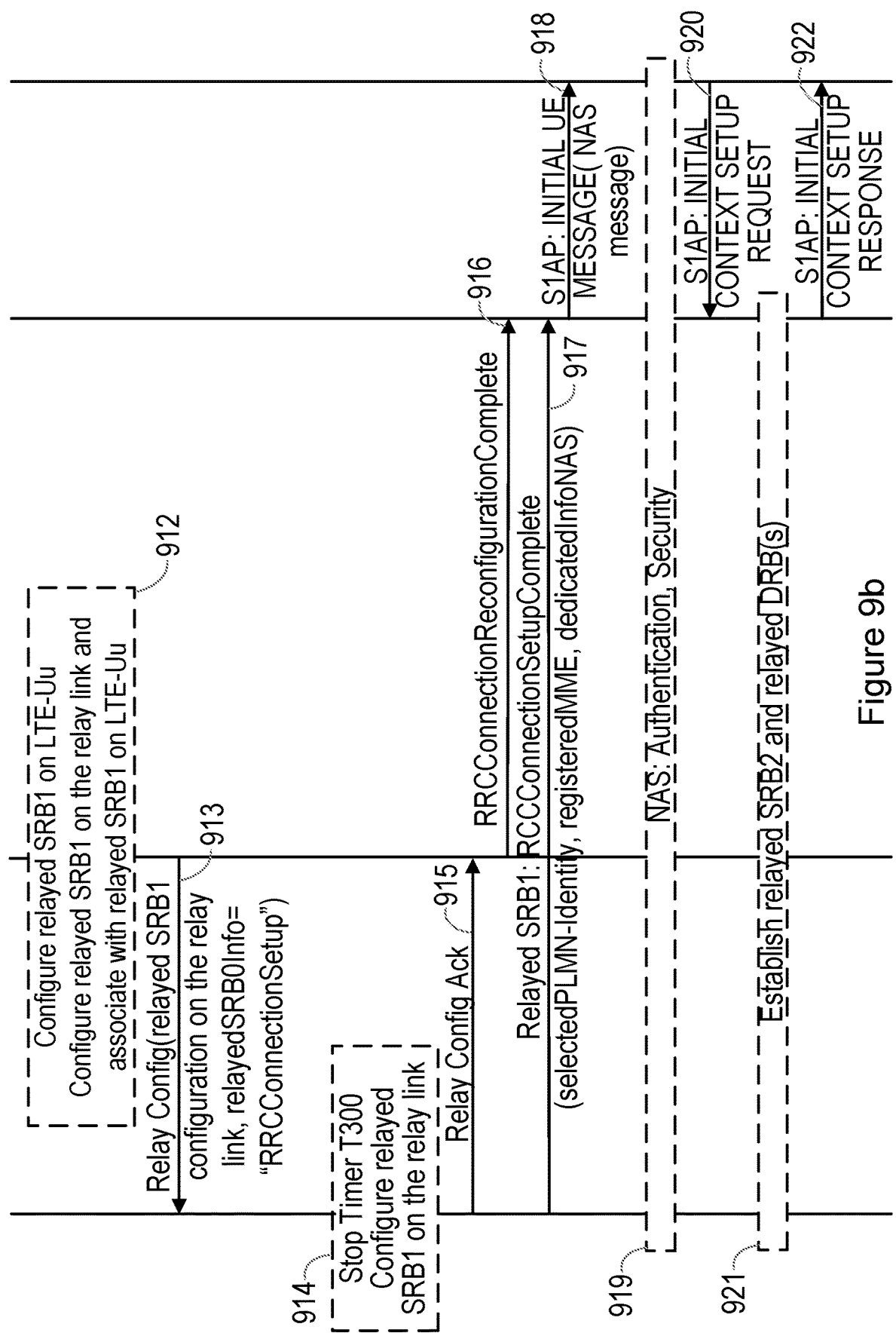

FIGS. 9a and 9b are a signalling diagram, illustrating a method according to the invention. In this method, the RRC messages for connection establishment are reused, but, between the relay UE and the eNB, the signaling radio bearer (SRB1) of the relay UE is used.

Thus, according to the present invention, the control plane connectivity realization between a Remote UE 801 and an eNB 805, includes utilizing the control plane connectivity and SRB1 between Relay UE 803 and the eNB 805.

In FIGS. 9a and 9b, we assume, for simplicity, that the relay UE already has an RRC connection of its own with E-UTRAN, i.e. the relay UE is RRC_CONNECTED. If the relay UE is in RRC_IDLE, it needs to enter RRC_CONNECTED in order to exchange signalling messages and data with the network.

In step 901, the relay UE 803 obtains information on how to transmit the relayed control plane over the air interface to the eNB 805. In particular, relayed RRC Connection establishment signaling, like the RRC Connection request message, usually sent over SRB0.

According to one aspect of the present invention, it is thus proposed to include, in the RRC Connection Reconfiguration message from the eNB, a new indication, hereafter referred to as "rcp-Configuration" (relay-control-plane-Configuration), that can inform the relay UE about how it should relay the control plane of other UEs (such as the remote UE 801) to the eNB. This indication can include, for example, various settings for SRB0 relaying, for SRB1 and SRB2 relaying etc, or for only one of the above control plane signaling bearers).

In an alternative embodiment, the relay UE can obtain this information in other ways than through the RRC Connection Reconfiguration message from the eNB. For example, an eNB may broadcast, in a broadcast message, how relaying is to be done towards the eNB. This information may be included, e.g., in the System Information Block Type 18, or it may be part of other system information blocks. Alternatively, it may be a system information Block of its own. One advantage with including it in blocks other than system information block 18, or keeping it in a separate block, is that relaying of control plane information by a relay UE is not necessarily connected to support of LTE sidelink. In certain situations, the communication between a Relay UE and a Remote UE may be pursuant to other connectivity standards or protocols than LTE sidelink, and in such cases, the SIB18 may be less relevant.

Other alternatives for the Relay UE 803 to obtain information related to how to relay control plane signaling from Remote UE's may be to implement a "default" configuration for example according to a standard specification, or according to a pre-coded implementation.

As an example, as relayed SRB0 configuration on LTE-Uu, the specification states an information element value indicating "RRC message" when transmitting the relayed SRB0 messages using the ULInformationTransfer and DLInformationTransfer RRC messages, otherwise used to transport NAS messages. This information element would need to be included in the ULInformationTransfer and DLInformationTransfer RRC messages.

In step 902, the relay UE configures itself with the relayed SRB0 configuration. It also configures a corresponding relay SRB0 configuration for the relay link and associates this configuration with the SRB0 configuration on LTE-Uu. For example, in the case of LTE sidelink as the relay link, the SRB0 configuration may consist of a PDCP SDU type value used to indicate relayed SRB0. As a second example, also in the case of LTE sidelink as the relay link, the SRB0 configuration may consist of a specific layer 2 destination address value in the MAC layer (in DST field) used to indicate relayed SRB0. In the case where this configuration is pre-configured or there are default settings, no message is needed from the eNB.

In step 903, the relay UE sends a RRCConnectionReconfigurationComplete-confirmation message to the eNB.

In step 904, the Relay UE transmits a relayed SRB0 configuration to the Remote UE, possibly during the discovery procedure. This could also be pre-configured, use default settings or be stated in a specification, and in those cases no message is needed.

Thus, according to one aspect of the present invention and based at least in part on how control plane signaling information should be transmitted from the Relay UE 803 to the eNB 805, the Relay UE 803 informs the Remote UE 801 about details necessary to consider by the Remote UE 801, such that the Relay UE 803 can relay control plane signaling information. This type of configuration could for example include how Remote UEs should identify themselves, what types of connections are possible to request via relay (if restricted), what establishment cause values to use, how to set timers differently for control plane signaling over Relay etc. Other information may also be possible. Part of this information may be more or less copied to the Remote UE from what the Relay UE received in the RRC connection reconfiguration, whereas other information may actually be constructed by the Relay UE, based on, for example, what type of and what the performance the relay link provides.

In step 905, the establishment of an RRC connection to the network from the relay UE is triggered (e.g. by the NAS layer in the remote UE, or a received paging message via the selected relay UE). In this particular case, it is beneficial to setup a connection via the relay UE. This criterion could for instance be that the Remote UE has previously used a Relay UE with good connectivity and that the UE has UL data to send. It could also be that it receives a message from the relay UE (e.g. a paging message). In many cases, however, the remote UE has already discovered and selected a relay UE (e.g. using a discovery procedure). If it has not, it first has to perform discovery and selection of a relay UE.

In step 906, the remote UE starts timer T300 to supervise the procedure. Since the messages will be relayed, it is possible that a longer timer value is needed, compared with the conventional procedure.

In step 907, the Remote UE sends a RRC connection request to the Relay UE including its UE identity (e.g. the S-TMSI, a random number or any other identifier) and a new establishment Cause="Relay", using configuration details for transmission of SRB0 over relay, that either were received from the Relay UE in previous steps, or that are preconfigured (determined via standard or otherwise) in the Remote UE.

In step 908, the Relay UE creates a remote UE reference associated to the Remote UE connection request (possibly based on or equal to the Remote UE identity).

In step 909, the Relay UE sends an RRC ULInformation-Transfer message to the eNB including the remote UE reference and indicating that the Remote UE wants to establish a RRC connection, using the relayed SRB0 on LTE-Uu. This message is transmitted within the Relay UE SRB1 configuration, i.e., the entity communicating with the eNB in this phase is not the Remote UE 801, but rather the Relay UE 803, relaying a Remote UE 801 message. Even though in this embodiment the forwarding is mapped to an existing control plane RRC message, the ULInformationTransfer, it may equally well be transmitted with another or even a new specified message that is carried over SRB1, e.g., a new "ULRelayTransfer" message or similar. Thus, including the RRC connection Request from a remote UE in the UL Information transfer should be considered as an example only.

In step 910, the eNB that receives the RRCConnectionRequest message recognizes the establishment Cause=Relay and proceeds with the RRC Connection establishment in the normal way, and thus it creates an RRC context for the Remote UE, but in addition it associates the created RRC context of the Remote UE as the result of this message with the RRC context of the relay UE which forwarded the message. In this way the relay UE and remote UE are linked in the eNB. Since the RRCConnectionRequest message from the remote UE is sent on channels belonging to the relay UE (its SRB1), the eNB associates the remote UE context with the included remote UE reference and the relay UE. The eNB also configures the relayed SRB1 on LTE-Uu. An example of the SRB1 configuration on LTE Uu is a specific bearer identity value (such as "1" for SRB1) plus the remote UE reference to be used in the adaptation layer. The adaptation layer is typically used to multiplex multiple bearers, including signalling radio bearers such as SRB1, over lower protocol layers, without affecting the data carried on top of the adaptation layer and without the need to have one lower layer bearer for each Remote UE and bearer. In case of SRB1, the data carried on top of the adaptation layer would be PDCP PDUs belonging to the Remote UE. As a given Relay may need to provide relaying for multiple Remote UEs simultaneously over a single LTE-Uu bearer belonging to the Relay UE, an identity of the Remote UE is needed as part of the adaptation layer. And as a given Remote UE may need to establish multiple bearers, apart from SRB1, the adaptation layer includes a bearer identity as well.

In step 911, the eNB reconfigures the Relay UE with the relayed SRB1 by transmitting an RRCConnectionReconfiguration message, with information corresponding to its own SRB1 configuration made in step 910, including the remote UE reference. It also sends an RRCConnectionSetup message on the relayed SRB0 on LTE-Uu. This message is intended for the remote UE as part of the RRC connection establishment procedure. It may be contained in an information element in the same RRC message as the RRCConnectionReconfiguration message to the relay UE (as shown in FIG. 9), or alternatively it may be sent in a separate message, such as a DLInformationTransfer message, or a new specified message, e.g., "DLRelayTransfer".

In step 912, the Relay UE configures the relayed SRB1 on LTE-Uu according to the received relayed SRB1 configuration from the eNB. It also configures a relayed SRB1 on the relay link and then associates the relayed SRB1 configuration over LTE Uu with the relayed SRB1 configuration on the relay link. For example, the relayed SRB1 on the relay link can use, in the case where an LTE sidelink is used as the relay link, a specific SDU type in the PDCP layer or a specific logical channel identity in the MAC layer. As another example, the relayed SRB1 may contain a specific value used in an adaptation layer over the LTE sidelink.

In step 913, the relay UE configures the Remote UE with the relayed SRB1 configuration on the relay link, matching its own configuration performed in step 912. It also forwards the RRCConnectionSetup message received on the relayed SRB0 on LTE-Uu, to the remote UE on the relayed SRB0 on the relay link. It may be contained in an information element in the same message as carrying the relayed SRB1 configuration to the remote UE (as shown in the Figure), or alternatively in a separate message.

In step 914, the remote UE configures its SRB1 according to the information obtained in step 913 from the Relay UE. It also stops the timer, assuming that the process has been carried out within the permitted time. In determining the SRB1 configuration the remote UE may also make use of configuration that is standardized or pre-configured and thus, not necessarily explicitly included in the information from the relayed SRB1 configuration information from the Relay UE.

In step 915, the remote UE transmits an acknowledgment of the configurations to the Relay UE, with a Relay Config Ack message.

In step 916, the relay UE acknowledges to the eNB that the RRC reconfiguration is complete with a RRCConnectionReconfigurationComplete message.

In step 917, the remote UE informs the eNB that the RRC connection setup is complete by providing an RRCConnectionSetupComplete message with its PLMN identity, its registered MME and dedicated NAS information. This message is sent on the newly configured relayed SRB1.

In step 918, the dedicated NAS information received in the RRCConnectionSetupComplete is forwarded to the MME in INITIAL UE MESSAGE, which is a request to establish a NAS signalling connection between the MME and the remote UE.

In step 919, the MME now authenticates the remote UE, if needed, and security (ciphering and integrity protection) is activated between the eNB and the remote UE. This uses the normal procedures.

In step 920, after authentication and security activation has been successfully completed, the MME sends an INITIAL CONTEXT SETUP REQUEST message to the eNB, providing the UE information to establish a full UE context in the eNB, including the permanent identity (IMSI) and a bearer configuration.

Figure 10:
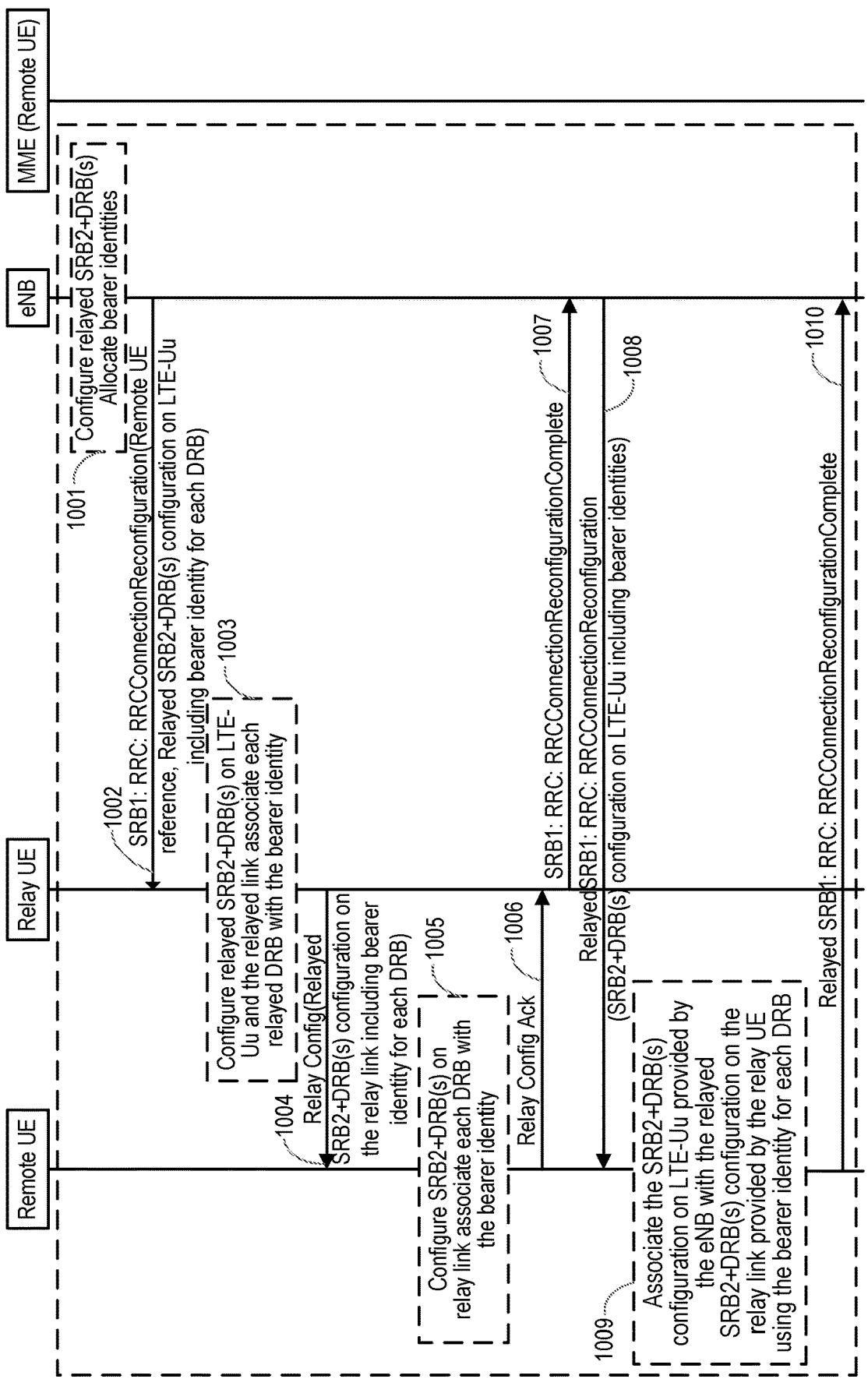
FIG. 10 illustrates further signalling of bearer establishments according to the present invention.

In step 921, the relayed SRB2 and the relayed data radio bearers for the remote UE are established using the same messages as would be used over LTE-Uu but all messages are relayed through the Relay UE. Another difference is that no physical layer for the Uu interface is needed in those messages. Apart from the RRCConnectionSetupComplete message, which is the first message sent on the relayed SRB1, RRC messages which are normally sent on SRB1 should be able to be sent on the relayed SRB1 when they concern the Remote UE. So, the condition to map an RRC message on the relayed SRB1 rather than SRB1 is that it originates from the Remote UE or has the Remote UE as destination. In addition, for the downlink messages sent from the eNB, the eNB selects whether to put a given RRC message on the normal SRB1 (when sent to the Relay UE), or a given relayed SRB1 (when sent to a given Remote UE). FIG. 10 below illustrates in further detail the steps to establish relayed SRB2 and relayed data radio bearers.

In step 922, the eNB now acknowledges to the MME with an INITIAL CONTEXT SETUP RESPONSE message that the UE context including bearers has been successfully established.

As mentioned above, FIG. 10 illustrates the steps to establish the relayed SRB2 and the relayed data radio bearers (DRB's).

Thus, in step 1001, the eNB configures the relayed SRB2 and any data radio bearers (DRBs) and allocates bearer identities.

In step 1002, the eNB sends on SRB1 an RRCConnectionReconfiguration message to the relay UE, containing the remote UE reference, and the relayed SRB2 and DRB(s) configurations on LTE-Uu, including the bearer identity for each DRB.

In step 1003, the relay UE configures the relayed SRB2 and DRB(s) on LTE-Uu, and the relayed link, and associates each relayed DRB with the respective bearer identity.

In step 1004, the relay UE sends a relay configuration message to the remote UE, containing the relayed SRB2 and DRB(s) configurations on the relay link, including the bearer identity for each DRB. Dependent on the realization of a relay link (e.g., an LTE sidelink, Wi-Fi, Bluetooth or other standards and/or protocols) though this "configuration" may vary.

In step 1005, the remote UE configures the relayed SRB2 and DRB(s) on the relay link, and associates each relayed DRB with the respective bearer identity.

In step 1006, the remote UE sends a Relay Config Ack to the relay UE.

In step 1007, the relay UE sends on SRB1 a RRCConnectionReconfigurationComplete message to the eNB.

In step 1008, the eNB sends to the remote UE on the relayed SRB1 a RRCConnectionReconfiguration message, containing the relayed SRB2 and DRB(s) configurations on LTE-Uu, including the bearer identities.

In step 1009, the remote UE associates the SRB2 and DRB(s) configurations on LTE-Uu provided by the eNB with the relayed SRB2 and DRB(s) configurations on the relay link provided by the relay UE, using the bearer identity for each DRB.

In step 1010, the remote UE sends on the relayed SRB1 a RRCConnectionReconfigurationComplete message to the eNB.

The method is described above in the context of an embodiment in which a connection between the Remote UE and the Relay UE is realized through an LTE Sidelink. As indicated above though, the invention is however equally applicable if the remote-to-relay UE connection is realized using any other wireless standard technology, for example, if the Remote to Relay UE is using WLAN for connectivity. Irrespective of which radio or other interface exists between the Remote UE and the Relay UE, that interface may include a protocol discriminator, such that the Layer-2 (e.g., MAC) sublayer can interpret and distinguish transmissions including 3GPP RRC messages. One way of solving this in WLAN is through the use of a specific EtherType Protocol Discrimination, EPD. Thus, when a Relay and Remote UE communicate over WLAN (in tethering mode, or in Peer-to-Peer/Wi-Fi Direct manner) RRC transmissions may for example be sent in MAC Sublayer SDU's (MSDUs) with an associated EtherType that may be specific or at least indicate that the content of the Data Unit includes 3GPP RRC signaling.

In this way, it will be possible to, e.g., when received in a relay UE, direct such content to the correct 3GPP RRC entity. A similar way of using EtherType is also used for LTE-WLAN Aggregation, see, e.g., 3GPP TS 36.300, v 13.4.0, chapter 22A.1.2. Other ways to distinguish RRC information over other protocols are of course possible, and it may also be possible, within a non-3GPP protocol, to define a specific signaling or management frame that is intended to carry non-native signaling, e.g., through indicating what it actually is. In WLAN, a Vendor Specific element is sometimes used for this purpose.

Figure 11:
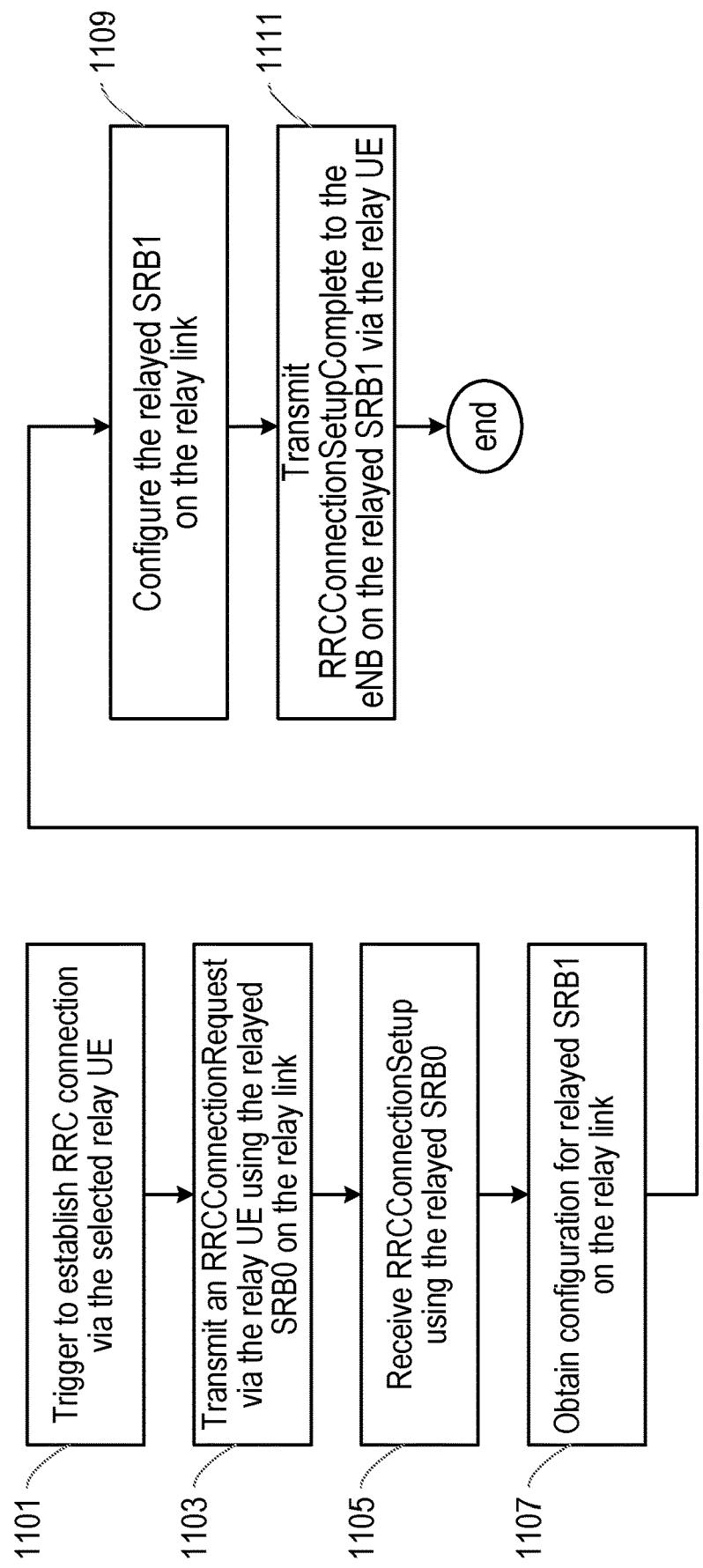
FIG. 11 illustrates a part of a method performed in a network.

FIG. 11 illustrates the main steps performed by the remote UE.

Thus, in step 1101, the remote UE is triggered to establish an RRC connection via the selected relay UE.

In step 1103, the remote UE transmits an RRCConnectionRequest via the relay UE using the relayed SRB0 on the relay link.

In step 1105, the remote UE receives an RRCConnectionSetup message using the relayed SRB0.

In step 1107, the remote UE obtains a configuration for the relayed SRB1 on the relay link.

In step 1109, the remote UE configures the relayed SRB1 on the relay link.

In step 1111, the remote UE transmits a RRCConnectionSetupComplete message to the eNB on the relayed SRB1 via the relay UE.

It should be noted that, in FIG. 11, it is not illustrated that there may be an information exchange with respect to configuration of Remote UE, and information related to exactly how the Remote UE should send an RRC Connection Request, as described above. In situations when this is not pre-configured, these steps should also be included, as described in connection with step 904 of FIG. 9.

Figure 12:
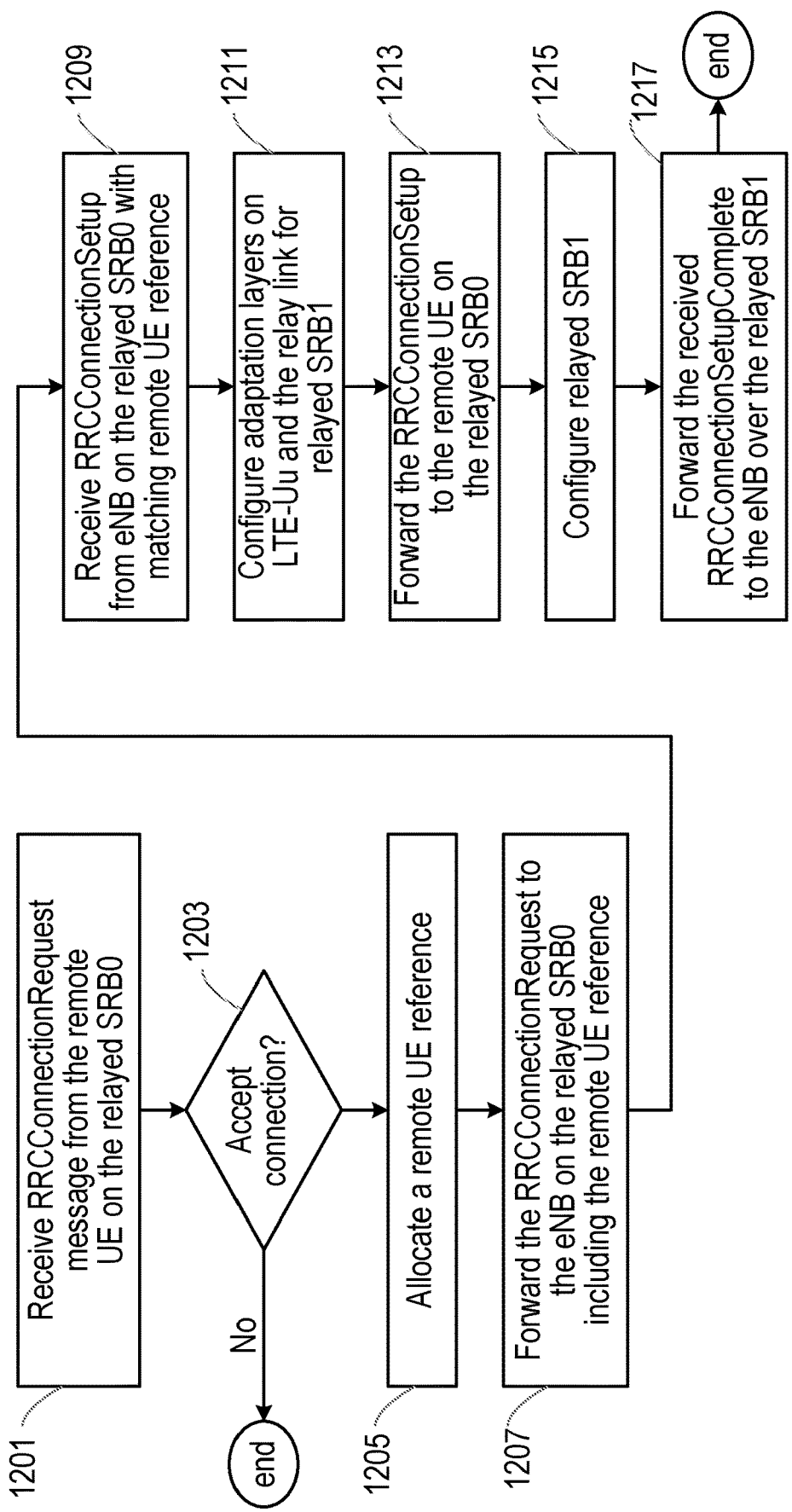
FIG. 12 illustrates a part of a method performed in a network.

FIG. 12 illustrates the main steps performed by the relay UE.

Thus, in step 1201, the relay receives the RRCConnectionRequest message from the remote UE on the relayed SRB0.

In step 1203, the relay determines whether to accept the connection. If it decides not to accept the connection, the method ends. If it decides to accept the connection, the method passes to step 1205.

In step 1205, the relay UE may allocate a reference to the remote UE. In certain situations, the relay UE may already have specific references of remote UE's, e.g., as a result of remote-to-relay-connection establishment or configuration. Such references may very well be at least in part re-used.

In step 1207, the relay UE forwards the RRCConnectionRequest message to the eNB on the relayed SRB0 including the allocated remote UE reference.

In step 1209, the relay UE receives an RRCConnectionSetup message from the eNB on the relayed SRB0, with a matching remote UE reference.

In step 1211, the relay UE configures adaptation layers on LTE-Uu and the relay link for a relayed SRB1. The Relay UE configures the relayed SRB1 on LTE-Uu according to the received relayed SRB1 configuration from the eNB. It also configures a relayed SRB1 on the relay link and then associates the relayed SRB1 configuration over LTE Uu with the relayed SRB1 configuration on the relay link. For example, the relayed SRB1 on the relay link can use, in the case where an LTE sidelink is used as the relay link, a specific SDU type in the PDCP layer or a specific logical channel identity in the MAC layer, in which case there may be no need for an adaptation layer. As another example, the relayed SRB1 may contain a specific value used in an adaptation layer over the LTE sidelink.

In step 1213, the relay UE forwards the RRCConnectionSetup message to the remote UE on the relayed SRB0.

In step 1215, the relay configures the relayed SRB1.

In step 1217, the relay UE forwards the received RRCConnectionSetupComplete message to the eNB over the relayed SRB1.

Figure 13:
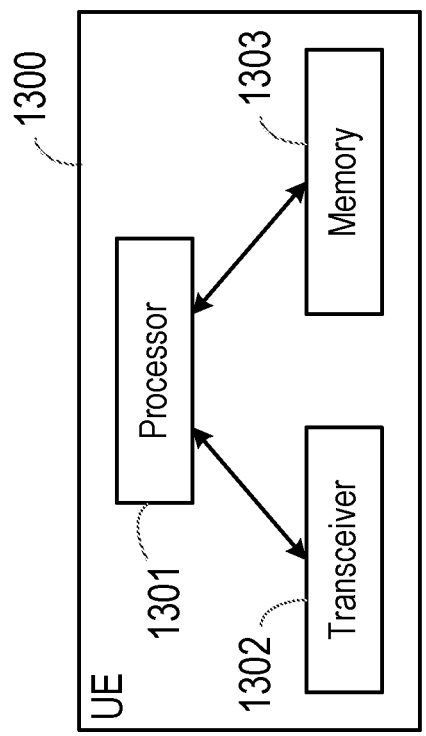
FIG. 13 shows a user equipment for use in aspects of the invention.

FIG. 13 shows a user equipment 1300 that can be adapted or configured to operate according to one or more of the non-limiting example embodiments described, either as a remote UE or as a relay UE as described herein. Of course, a single UE will typically be able to act as a remote UE or as a relay UE, as the circumstances dictate. The UE 1300 comprises a processor or processing unit 1301 that controls the operation of the device 1300. The processor 1301 is connected to a transceiver 1302 (which comprises a receiver and a transmitter) with associated antenna(s) and is used to transmit signals to and receive signals from nodes in the network or from other UEs. The UE 1300 also comprises a memory or memory unit 1303 that is connected to the processor 1301 and that contains instructions or computer code executable by the processor 1301 and other information or data required for the operation of the UE 1300 in accordance with the methods described herein.

Figure 14:
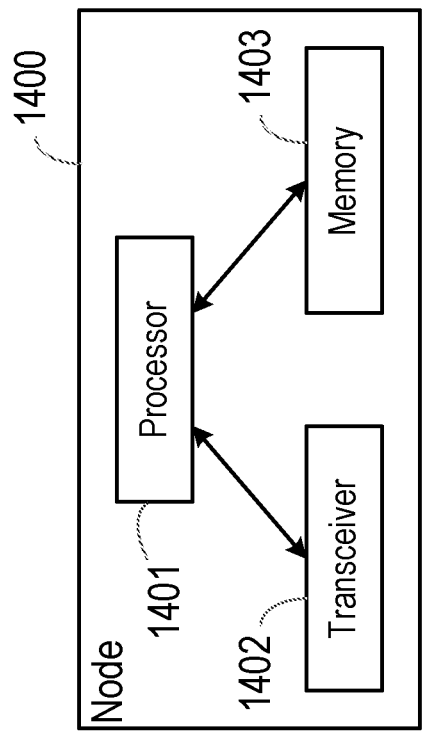
FIG. 14 shows a radio access node for use in aspects of the invention.

FIG. 14 shows a radio access node, for example an eNB 1400 that can be adapted or configured to operate according to one or more of the non-limiting example embodiments described. The illustrated radio access node may serve either a remote UE or a relay UE as described herein. Of course, a single radio access node will typically be able to serve many UEs simultaneously, and one or more of these UEs may be acting as a remote UE while one or more other UE is acting as a relay UE, as the circumstances dictate. The eNB 1400 comprises a processor or processing unit 1401 that controls the operation of the device 1400. The processor 1401 is connected to a transceiver 1402 (which comprises a receiver and a transmitter) with associated antenna(s) and network interfaces, and is used to transmit signals to and receive signals from other nodes in the network or from UEs. The eNB 1400 also comprises a memory or memory unit 1403 that is connected to the processor 1401 and that contains instructions or computer code executable by the processor 1401 and other information or data required for the operation of the eNB 1400 in accordance with the methods described herein.

Figure 15:
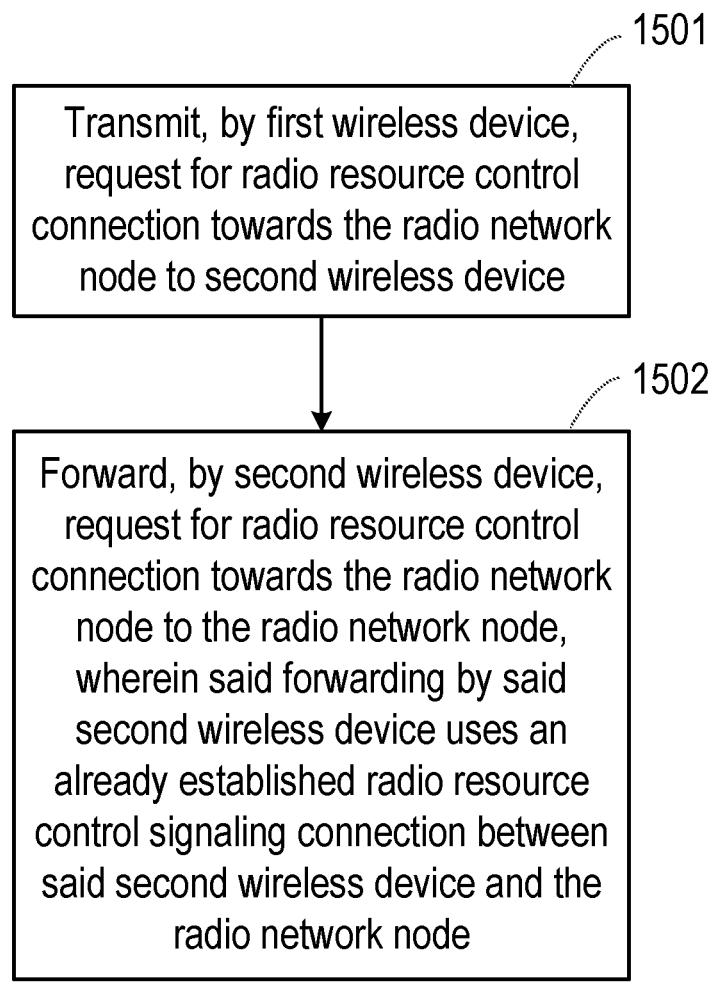
FIG. 15 illustrates a method for establishing a radio resource control connection between a first wireless device and a radio network node.

FIG. 15 illustrates a method for establishing a radio resource control connection between a first wireless device and a radio network node. The method comprises step 1501, transmitting, by said first wireless device, a request for a radio resource control connection towards the radio network node to a second wireless device. The method further comprises step 1502, forwarding, by said second wireless device, said request for a radio resource control connection towards the radio network node to the radio network node, wherein said forwarding by said second wireless device uses an already established radio resource control signaling connection between said second wireless device and the radio network node.

Figure 16:
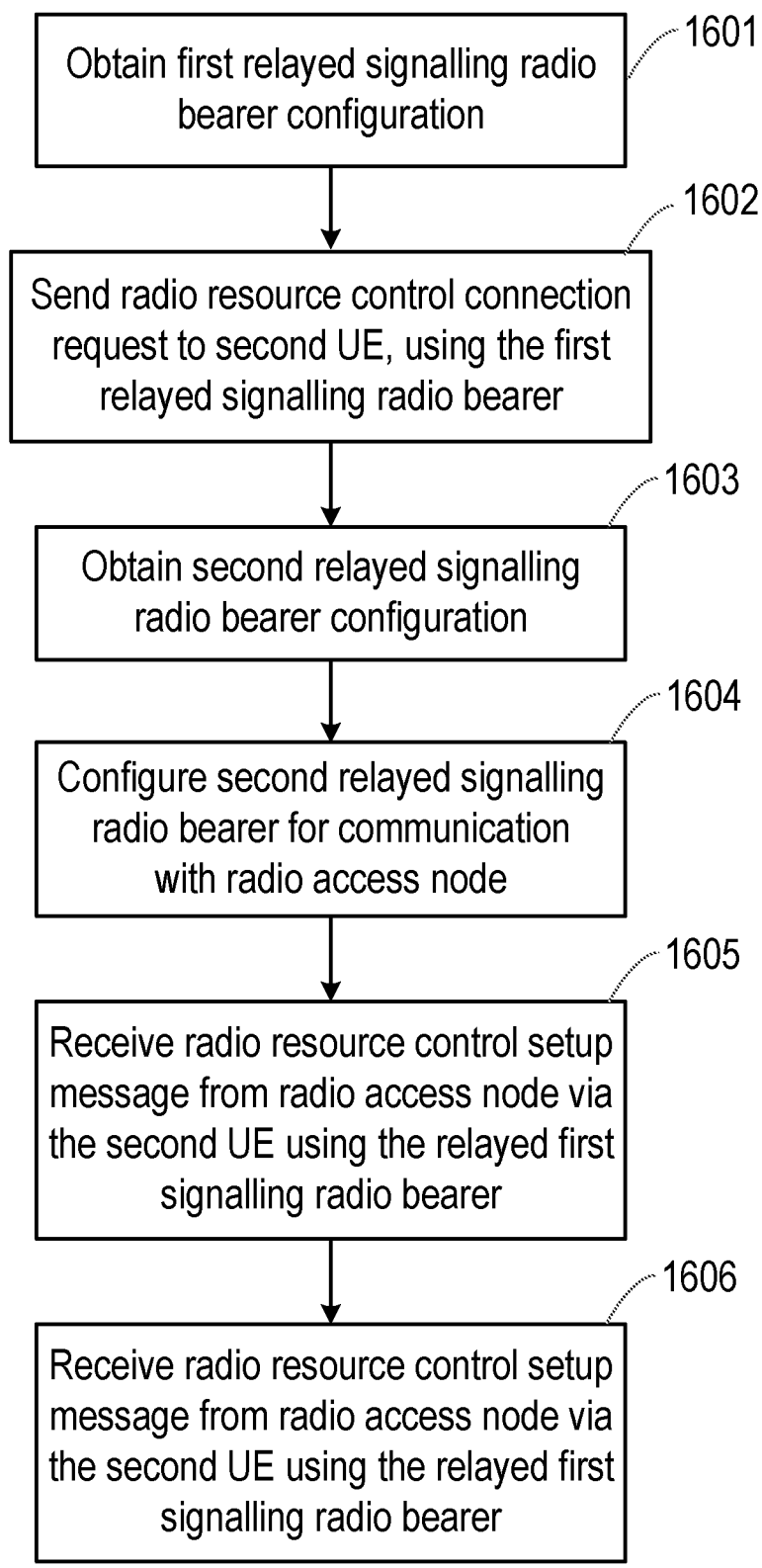
FIG. 16 illustrates a method of operation of a first user equipment.

FIG. 16 illustrates a method of operation of a first user equipment, UE. At step 1601, the UE obtains a first relayed signalling radio bearer configuration. At step 1602, the UE sends a radio resource control connection request to a second UE, using the first relayed signalling radio bearer. At step 1603, the UE obtains a second relayed signalling radio bearer configuration. At step 1604, the UE configures a second relayed signalling radio bearer for communication with a radio access node. At step 1605, the UE receives a radio resource control setup message from the radio access node via the second UE using the relayed first signalling radio bearer, and, at step 1606, the UE informs the radio access node that the radio resource control connection is complete, using the second relayed signalling radio bearer.

Figure 17:
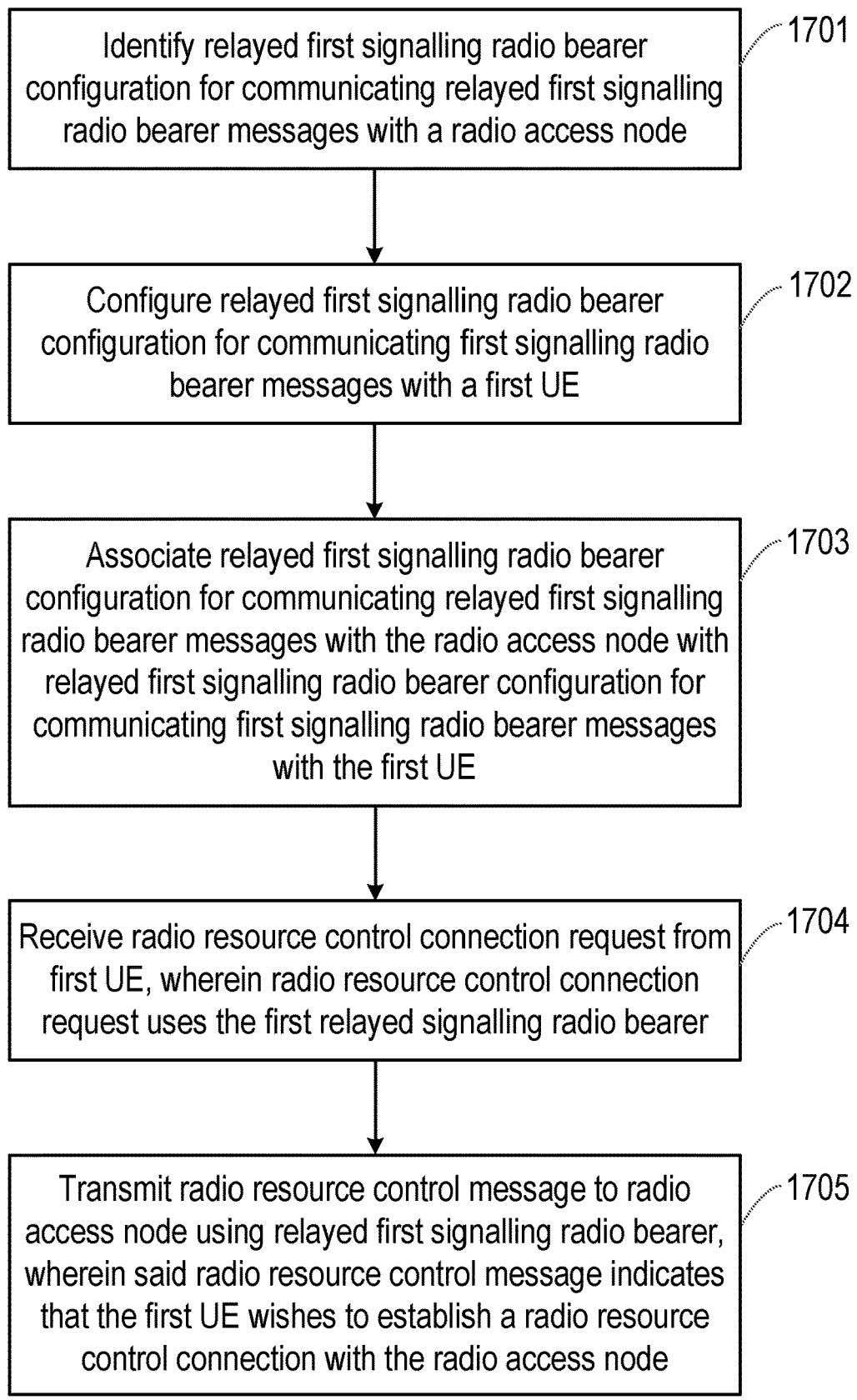
FIG. 17 illustrates a method of operation of a second user equipment.

FIG. 17 illustrates a method of operation of a second user equipment, UE. At step 1701, the UE identifies a relayed first signalling radio bearer configuration for communicating relayed first signalling radio bearer messages with a radio access node. At step 1702, the UE configures a relayed first signalling radio bearer configuration for communicating first signalling radio bearer messages with a first UE. At step 1703, the UE associates (a) the relayed first signalling radio bearer configuration for communicating relayed first signalling radio bearer messages with the radio access node with (b) the relayed first signalling radio bearer configuration for communicating first signalling radio bearer messages with the first UE. At step 1704, the UE receives a radio resource control connection request from the first UE, wherein the radio resource control connection request uses the first relayed signalling radio bearer, and, at step 1705, the UE transmits a radio resource control message to the radio access node using the relayed first signalling radio bearer, wherein said radio resource control message indicates that the first UE wishes to establish a radio resource control connection with the radio access node.

Figure 18:
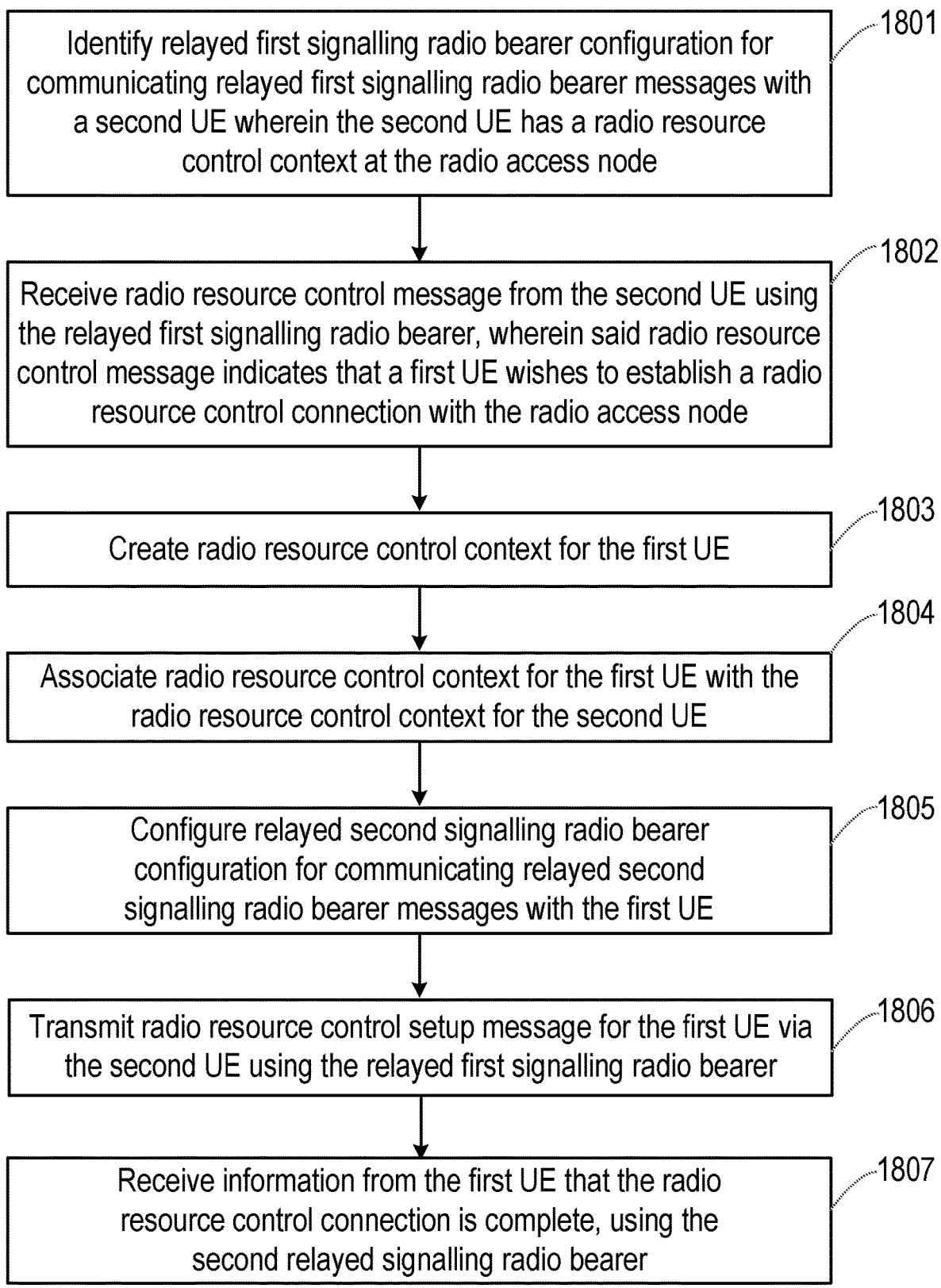
FIG. 18 illustrates a method of operation of a radio access node.

FIG. 18 illustrates a method of operation of a radio access node. At step 1801, the radio access node identifies a relayed first signalling radio bearer configuration for communicating relayed first signalling radio bearer messages with a second user equipment, UE, wherein the second UE has a radio resource control context at the radio access node. At step 1802, the node receives a radio resource control message from the second UE using the relayed first signalling radio bearer, wherein said radio resource control message indicates that a first UE wishes to establish a radio resource control connection with the radio access node. At step 1803, the node creates a radio resource control context for the first UE. At step 1804, the node associates the radio resource control context for the first UE with the radio resource control context for the second UE. At step 1805, the node configures a relayed second signalling radio bearer configuration for communicating relayed second signalling radio bearer messages with the first UE. At step 1806, the node transmits a radio resource control setup message for the first UE via the second UE using the relayed first signalling radio bearer. At step 1807, the node receives information from the first UE that the radio resource control connection is complete, using the second relayed signalling radio bearer.

Figure 19:
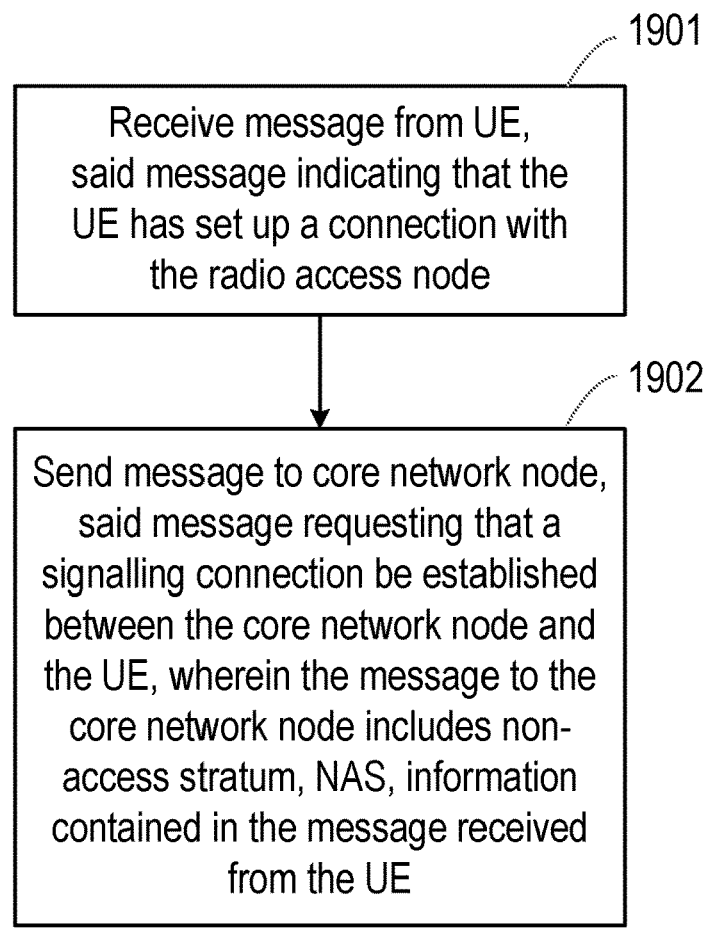
FIG. 19 illustrates a method of operation of a radio access node.

FIG. 19 illustrates a method of operation of a radio access node. At step 1901, the node receives a message from a user equipment, UE, said message indicating that the UE has set up a connection with the radio access node, and said message having been relayed through a relay UE after the UE has established a relay relationship with the relay UE. At step 1902, the node sends a message to a core network node, said message requesting that a signalling connection be established between the core network node and the UE, wherein the message to the core network node includes non-access stratum, NAS, information contained in the message received from the UE.

Figure 20:
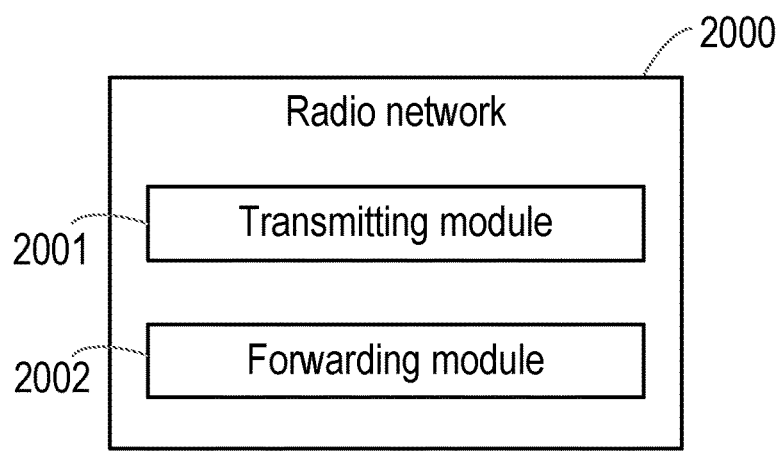
FIG. 20 illustrates a radio network.

FIG. 20 illustrates a radio network 2000 comprising a first wireless device and a second wireless device. The radio network comprises a transmitting module 2001 for transmitting, by said first wireless device, a request for a radio resource control connection towards the radio network node to a second wireless device. The radio network further comprises a forwarding module 2002 for forwarding, by said second wireless device, said request for a radio resource control connection towards the radio network node to the radio network node, wherein said forwarding by said second wireless device uses an already established radio resource control signaling connection between said second wireless device and the radio network node.

Figures 21, 22:
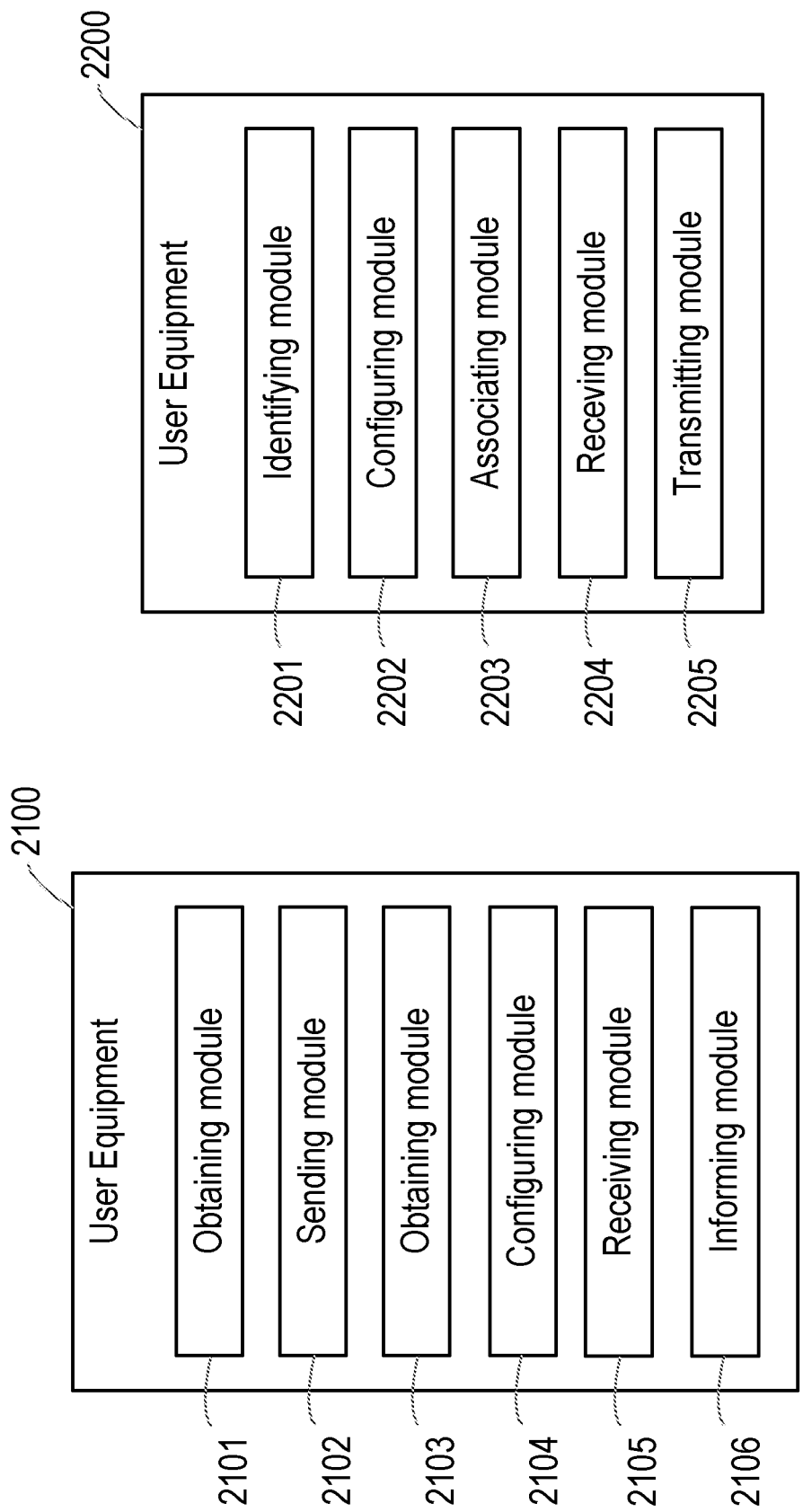
FIG. 21 illustrates a user equipment.
FIG. 22 illustrates a user equipment.

FIG. 21 illustrates a user equipment 2100. The UE 2100 comprises: an obtaining module 2101 for obtaining a first relayed signalling radio bearer configuration; a sending module 2102 for sending a radio resource control connection request to a second UE, using the first relayed signalling radio bearer; an obtaining module 2103 for obtaining a second relayed signalling radio bearer configuration; a configuring module 2104 for configuring a second relayed signalling radio bearer for communication with a radio access node; a receiving module 2105 for receiving a radio resource control setup message from the radio access node via the second UE using the relayed first signalling radio bearer; and an informing module 2106 for informing the radio access node that the radio resource control connection is complete, using the second relayed signalling radio bearer.

FIG. 22 illustrates a user equipment 2200. The UE 2200 comprises: an identifying module 2201 for identifying a relayed first signalling radio bearer configuration for communicating relayed first signalling radio bearer messages with a radio access node; a configuring module 2202 for configuring a relayed first signalling radio bearer configuration for communicating first signalling radio bearer messages with a first UE; an associating module 2203 for associating (a) the relayed first signalling radio bearer configuration for communicating relayed first signalling radio bearer messages with the radio access node with (b) the relayed first signalling radio bearer configuration for communicating first signalling radio bearer messages with the first UE; a receiving module 2204 for receiving a radio resource control connection request from the first UE, wherein the radio resource control connection request uses the first relayed signalling radio bearer; and a transmitting module 2205 for transmitting a radio resource control message to the radio access node using the relayed first signalling radio bearer, wherein said radio resource control message indicates that the first UE wishes to establish a radio resource control connection with the radio access node.

FIG. 23 illustrates a first radio access node 2300 in a radio access network further comprising a second radio access node. The first radio access node 2300 comprises: an identifying module 2301 for identifying a relayed first signalling radio bearer configuration for communicating relayed first signalling radio bearer messages with a second user equipment, UE, wherein the second UE has a radio resource control context at the radio access node; a receiving module 2302 for receiving a radio resource control message from the second UE using the relayed first signalling radio bearer, wherein said radio resource control message indicates that a first UE wishes to establish a radio resource control connection with the radio access node; a creating module 2303 for creating a radio resource control context for the first UE; an associating module 2304 for associating the radio resource control context for the first UE with the radio resource control context for the second UE; a configuring module 2305 for configuring a relayed second signalling radio bearer configuration for communicating relayed second signalling radio bearer messages with the first UE; a transmitting module 2306 for transmitting a radio resource control setup message for the first UE via the second UE using the relayed first signalling radio bearer; and a receiving module 2307 for receiving information from the first UE that the radio resource control connection is complete, using the second relayed signalling radio bearer.

FIG. 24 illustrates a radio access node 2400 in a radio access network. The radio access node 2400 comprises: a receiving module 2401, for receiving a message from a user equipment, UE, said message indicating that the UE has set up a connection with the radio access node, and said message having been relayed through a relay UE after the UE has established a relay relationship with the relay UE; and a sending module 2402, for sending a message to a core network node, said message requesting that a signalling connection be established between the core network node and the UE, wherein the message to the core network node includes non-access stratum, NAS, information contained in the message received from the UE.

Thus, there are described methods that deal with issues relating to RRC connection establishment in the case of UE-to-Network relaying.

The invention claimed is:

1. A method of operation of a first user equipment (UE), the method comprising:
- obtaining a first relayed signaling radio bearer configuration;
- sending a radio resource control connection request to a second UE, using the first relayed signaling radio bearer, for relaying to a radio access node;
- obtaining a second relayed signaling radio bearer configuration;
- configuring a second relayed signaling radio bearer for communication with the radio access node;
- receiving a radio resource control setup message from the radio access node via the second UE using the first relayed signaling radio bearer; and
- informing the radio access node that the radio resource control connection is complete, using the second relayed signaling radio bearer.

2. The method of claim 1, comprising obtaining the first relayed signaling radio bearer configuration by receiving the configuration from the second UE.

3. The method of claim 1, wherein the first UE is preconfigured with the first relayed signaling radio bearer configuration.

4. The method of claim 1, wherein the radio resource control connection request contains an identifier for the first UE.

5. The method of claim 1, comprising obtaining the second relayed signaling radio bearer configuration by receiving the second relayed signaling radio bearer configuration from the second UE.

6. The method of claim 1, comprising obtaining the second relayed signaling radio bearer configuration by receiving some information from the second UE, wherein the first UE is preconfigured with other information for use in determining the second relayed signaling radio bearer configuration.

7. A user equipment, comprising a processor and a memory, the memory containing instructions executable by the processor, such that the user equipment is operable to:
- obtain a first relayed signaling radio bearer configuration;
- send a radio resource control connection request to a second UE, using the first relayed signaling radio bearer, for relaying to a radio access node;
- obtain a second relayed signaling radio bearer configuration;
- configure a second relayed signaling radio bearer for communication with the radio access node;
- receive a radio resource control setup message from the radio access node via the second UE using the first relayed signaling radio bearer; and
- inform the radio access node that the radio resource control connection is complete, using the second relayed signaling radio bearer.

* * * * *